United States Patent
Walia et al.

(10) Patent No.: US 12,236,191 B2
(45) Date of Patent: *Feb. 25, 2025

(54) WORKFLOW INSTRUCTION INTERPRETATION FOR WEB TASK AUTOMATION

(71) Applicant: YAAR INC., Toronto (CA)

(72) Inventors: Karan Walia, Brampton (CA); Anton Mamonov, Toronto (CA); Sobi Walia, Brampton (CA)

(73) Assignees: Karan Walia, Brampton (CA); Anton Mamonov, Toronto (CA); Sobi Walia, Brampton (CA)

(*) Notice: Subject to any disclaimer, the term of this patent is extended or adjusted under 35 U.S.C. 154(b) by 259 days.

This patent is subject to a terminal disclaimer.

(21) Appl. No.: 17/395,229

(22) Filed: Aug. 5, 2021

(65) Prior Publication Data

US 2023/0038691 A1    Feb. 9, 2023

(51) Int. Cl.
*G06F 40/274* (2020.01)
*G06F 16/9532* (2019.01)
(Continued)

(52) U.S. Cl.
CPC ........ *G06F 40/274* (2020.01); *G06F 16/9532* (2019.01); *G06F 16/9574* (2019.01); *G06F 16/972* (2019.01); *G06N 5/02* (2013.01)

(58) Field of Classification Search
CPC .............. G06F 40/274; G06F 16/9532; G06F 16/9574; G06F 16/972; G06F 40/30; G06N 5/02; G06N 5/022

See application file for complete search history.

(56) References Cited

U.S. PATENT DOCUMENTS

| | | |
|---|---|---|
| 5,809,250 A | 9/1998 | Kisor |
| 6,418,471 B1 | 7/2002 | Shelton et al. |

(Continued)

FOREIGN PATENT DOCUMENTS

| | | | |
|---|---|---|---|
| WO | WO2019103738 A1 | 5/2019 | |
| WO | WO-2022199806 A1 * | 9/2022 | |

OTHER PUBLICATIONS

Pramanick, Pradip, et al. "DeComplex: Task planning from complex natural instructions by a collocating robot." 2020 IEEE/RSJ International Conference on Intelligent Robots and Systems (IROS). IEEE, 2020, pp. 6894-6901 (Year: 2020).*

(Continued)

*Primary Examiner* — Bravesh M Mehta
*Assistant Examiner* — Philip H Lam

(57) ABSTRACT

A method of executing a sequence of tasks includes receiving a natural language input indicative of the sequence of tasks. The natural language input may include a first task and a plurality of possible next tasks for the first task. The tasks may each be associated with a playback performance skeleton, indicative of a series of actions to be carried out on a web page. The series of action may have been generated, ahead of time, from a recorded performance of a similar task. The first task may be arranged to be performed. Then, based on a result of the performance of the first task, a successive task from among a plurality of possible next tasks associated with the result of performance of the first task may be selected. The successive task may then be arranged to be performed.

12 Claims, 17 Drawing Sheets

(51) Int. Cl.
  *G06F 16/957* (2019.01)
  *G06F 16/958* (2019.01)
  *G06N 5/02* (2023.01)

(56) References Cited

U.S. PATENT DOCUMENTS

| | | |
|---|---|---|
| 7,200,804 B1 | 4/2007 | Khavari et al. |
| 7,269,633 B2 | 9/2007 | Allan |
| 7,536,389 B1 | 5/2009 | Prabhakar et al. |
| 8,145,705 B1 | 3/2012 | Rust |
| 8,196,118 B2 | 6/2012 | Vainer et al. |
| 8,352,547 B1 | 1/2013 | Rust |
| 8,392,890 B2 | 3/2013 | Miller |
| 8,433,733 B2 | 4/2013 | Sayed et al. |
| 8,495,585 B2 | 7/2013 | Miller |
| 8,577,963 B2 | 11/2013 | Trahan et al. |
| 8,639,680 B1 | 1/2014 | Ciccolo |
| 8,683,447 B2 | 3/2014 | Miller |
| 8,706,860 B2 | 4/2014 | Trahan et al. |
| 8,799,412 B2 | 8/2014 | Trahan et al. |
| 8,954,416 B2 | 2/2015 | Tuttle |
| 8,984,491 B2 | 3/2015 | Miller |
| 9,195,768 B2 | 11/2015 | Jenkins et al. |
| 9,363,134 B1 | 6/2016 | Goodspeed |
| 9,418,172 B2 | 8/2016 | White et al. |
| 9,531,825 B1 | 12/2016 | Brooks et al. |
| 9,594,845 B2 | 3/2017 | Bengualid et al. |
| 9,621,406 B2 | 4/2017 | Trahan et al. |
| 9,740,791 B1* | 8/2017 | Killian .............. G06F 40/143 |
| 9,747,262 B1 | 8/2017 | Liu |
| 9,753,843 B2 | 9/2017 | Kandpal |
| 9,880,994 B1 | 1/2018 | Choi |
| 9,940,396 B1 | 4/2018 | Willhoit |
| 10,050,849 B1 | 8/2018 | Long |
| 10,083,159 B1 | 9/2018 | Bekmambetov et al. |
| 10,362,090 B2 | 7/2019 | Mahamuni et al. |
| 10,366,140 B2 | 7/2019 | Butt et al. |
| 10,382,386 B2 | 8/2019 | Gissing et al. |
| 10,394,925 B2 | 8/2019 | Bengualid et al. |
| 10,482,083 B2 | 11/2019 | Duke |
| 10,489,286 B2 | 11/2019 | Miller |
| 10,628,630 B1 | 4/2020 | Surace |
| 10,686,738 B2 | 6/2020 | Daniel et al. |
| 10,719,573 B2 | 7/2020 | Dube-Cousineau |
| 10,884,907 B1 | 1/2021 | Zhao et al. |
| 10,949,748 B2 | 3/2021 | Williams et al. |
| 11,016,967 B2 | 5/2021 | Duke |
| 11,263,118 B2 | 3/2022 | Bhadani |
| 11,507,497 B2 | 11/2022 | Zhao et al. |
| 11,636,252 B1 | 4/2023 | Myers |
| 11,803,415 B2 | 10/2023 | Dunn |
| 2003/0005044 A1 | 1/2003 | Miller et al. |
| 2003/0216913 A1 | 11/2003 | Keely |
| 2004/0100507 A1 | 5/2004 | Hayner et al. |
| 2004/0111488 A1* | 6/2004 | Allan .............. G06F 16/957 707/E17.119 |
| 2008/0077671 A1 | 3/2008 | Rust |
| 2008/0228494 A1 | 9/2008 | Cross |
| 2008/0235564 A1 | 9/2008 | Erol |
| 2009/0019354 A1 | 1/2009 | Jaiswal et al. |
| 2009/0100345 A1 | 4/2009 | Miller |
| 2010/0095208 A1 | 4/2010 | White et al. |
| 2011/0191676 A1 | 8/2011 | Guttman et al. |
| 2011/0258532 A1 | 10/2011 | Ceze |
| 2012/0045132 A1 | 2/2012 | Wong |
| 2012/0079395 A1 | 3/2012 | Bengualid et al. |
| 2012/0117455 A1 | 5/2012 | Fogel et al. |
| 2012/0166933 A1 | 6/2012 | Cui |
| 2012/0331375 A1 | 12/2012 | Fanning |
| 2013/0007100 A1 | 1/2013 | Trahan et al. |
| 2013/0007101 A1 | 1/2013 | Trahan et al. |
| 2013/0007102 A1 | 1/2013 | Trahan et al. |
| 2013/0007241 A1 | 1/2013 | Trahan et al. |
| 2013/0054675 A1 | 2/2013 | Jenkins et al. |
| 2013/0151600 A1 | 6/2013 | Miller |
| 2013/0151949 A1 | 6/2013 | Miller |
| 2013/0159317 A1 | 6/2013 | Huang et al. |
| 2013/0219368 A1 | 8/2013 | Carteri et al. |
| 2013/0227397 A1 | 8/2013 | Tvorun |
| 2013/0254139 A1 | 9/2013 | Lei |
| 2013/0290858 A1 | 10/2013 | Beveridge |
| 2013/0332398 A1 | 12/2013 | Wu |
| 2013/0332484 A1* | 12/2013 | Gajic .............. G06F 16/285 707/E17.014 |
| 2013/0332815 A1 | 12/2013 | Gallo |
| 2014/0013165 A1 | 1/2014 | Miller |
| 2014/0136013 A1* | 5/2014 | Wolverton .............. B60K 37/06 701/1 |
| 2014/0281918 A1 | 9/2014 | Wei |
| 2014/0373030 A1 | 12/2014 | Francis |
| 2015/0186249 A1 | 7/2015 | Miller |
| 2015/0254219 A1 | 9/2015 | Harel |
| 2015/0324377 A1 | 11/2015 | Hayden |
| 2016/0147645 A1 | 5/2016 | Kandpal |
| 2016/0188548 A1 | 6/2016 | Ciabarra et al. |
| 2016/0212073 A1 | 7/2016 | Kulkarni et al. |
| 2016/0219048 A1* | 7/2016 | Porras .............. H04L 41/40 |
| 2016/0224458 A1 | 8/2016 | Spiridonov |
| 2016/0259508 A1 | 9/2016 | Eccleston |
| 2017/0104841 A1 | 4/2017 | Duke |
| 2017/0124213 A1 | 5/2017 | Bengualid et al. |
| 2017/0220459 A1 | 8/2017 | Kulkarni |
| 2017/0220531 A1 | 8/2017 | Hamer |
| 2017/0337177 A1 | 11/2017 | Maxwell, III |
| 2018/0046471 A1 | 2/2018 | Peretz et al. |
| 2018/0123934 A1 | 5/2018 | Gissing et al. |
| 2018/0173375 A1 | 6/2018 | Webber |
| 2018/0192108 A1 | 7/2018 | Lyons |
| 2018/0203674 A1 | 7/2018 | Dayanandan |
| 2018/0314505 A1 | 11/2018 | Wang |
| 2018/0314513 A1 | 11/2018 | DiTullio |
| 2019/0020673 A1 | 1/2019 | Weinstein |
| 2019/0228766 A1* | 7/2019 | White .............. G06Q 10/1093 |
| 2019/0317977 A1 | 10/2019 | Butt |
| 2020/0042516 A1 | 2/2020 | Duke |
| 2020/0110781 A1 | 4/2020 | Staszak |
| 2020/0133829 A1 | 4/2020 | Zazo et al. |
| 2020/0134098 A1 | 4/2020 | Dube-Cousineau |
| 2020/0143805 A1* | 5/2020 | Roy .............. G11B 27/34 |
| 2020/0175430 A1* | 6/2020 | Kochura .............. H04L 51/02 |
| 2020/0226126 A1 | 7/2020 | Zou |
| 2020/0364953 A1* | 11/2020 | Simoudis .............. G06N 5/022 |
| 2020/0379889 A1 | 12/2020 | Hamid |
| 2021/0004436 A1* | 1/2021 | Jauhar .............. G06F 16/24578 |
| 2021/0064821 A1 | 3/2021 | Seth |
| 2021/0082424 A1* | 3/2021 | Johnson .............. G10L 15/22 |
| 2021/0109769 A1 | 4/2021 | Yang |
| 2021/0119955 A1* | 4/2021 | Penov .............. G06Q 10/1095 |
| 2021/0124675 A1 | 4/2021 | Zhao et al. |
| 2021/0216442 A1 | 7/2021 | Bhadani |
| 2021/0232121 A1* | 7/2021 | Pramanick .............. G06F 40/30 |
| 2021/0271671 A1 | 9/2021 | Duke |
| 2021/0303342 A1 | 9/2021 | Dunn |
| 2022/0198390 A1 | 6/2022 | DeLuca |
| 2022/0309150 A1 | 9/2022 | Tsirkin |
| 2022/0342646 A1 | 10/2022 | Ayyalasomayajula |
| 2023/0018387 A1* | 1/2023 | Kuksta .............. G06F 16/954 |

OTHER PUBLICATIONS

Li, Toby Jia-Jun, et al. "Interactive task learning from GUI-grounded natural language instructions and demonstrations." Proceedings of the 58th Annual Meeting of the Association for Computational Linguistics: System Demonstrations. (2020), pp. 215-223 (Year: 2020).*

Eric, Mihail, et al. "Key-value retrieval networks for task-oriented dialogue." arXiv preprint arXiv:1705.05414 (2017). (Year: 2017).*

Tüysüz, G., Avenoglu, B., & Eren, P. E. (Sep. 2013). A workflow-based mobile guidance framework for managing personal activities. In 2013 Seventh International Conference on Next Generation Mobile Apps, Services and Technologies (pp. 13-18). IEEE (Year: 2013).*

(56) References Cited

OTHER PUBLICATIONS

Lau, Tessa et al. "A Conversational Interface to Web Automation", Oct. 3, 2010, ACM. (Year: 2010).
Barman, Shaon et al. Ringer: Web Automation by Demonstration, Nov. 2, 2016, ACM. (Year: 2016).
"Standard ECMA-404: The JSON Data Interchange Syntax", Dec. 2017, Ecma International. (Year 2017).
Non-final Office Action dated Sep. 10, 2021 in U.S. Appl. No. 17/244,457.
Final Office Action dated Apr. 4, 2022 issued by the USPTO in U.S. Appl. No. 17/244,457.
Final Office Action mailed by the USPTO on Jul. 10, 2023, in the related U.S. Appl. No. 17/244,457.
Non-Final Office Action mailed by the USPTO on May 4, 2023, in the related U.S. Appl. No. 17/244,558.
Non-Final Office Action mailed by the USPTO on Sep. 19, 2022, in the related U.S. Appl. No. 17/244,457.
Final Office Action mailed by the USPTO on Jul. 24, 2024, in the related U.S. Appl. No. 17/244,457.
Notice of Allowance mailed by the USPTO on Jul. 10, 2024, in the related U.S. Appl. No. 17/395,164.
Non-Final Office Action mailed by the USPTO on Jan. 17, 2024, in the related U.S. Appl. No. 17/244,457.
Non-Final Office Action mailed by the USPTO on Jan. 17, 2024, in the related U.S. Appl. No. 17/395,164.
Notice of Allowance mailed by the USPTO on Oct. 11, 2024, in the related U.S. Appl. No. 17/244,558.

\* cited by examiner

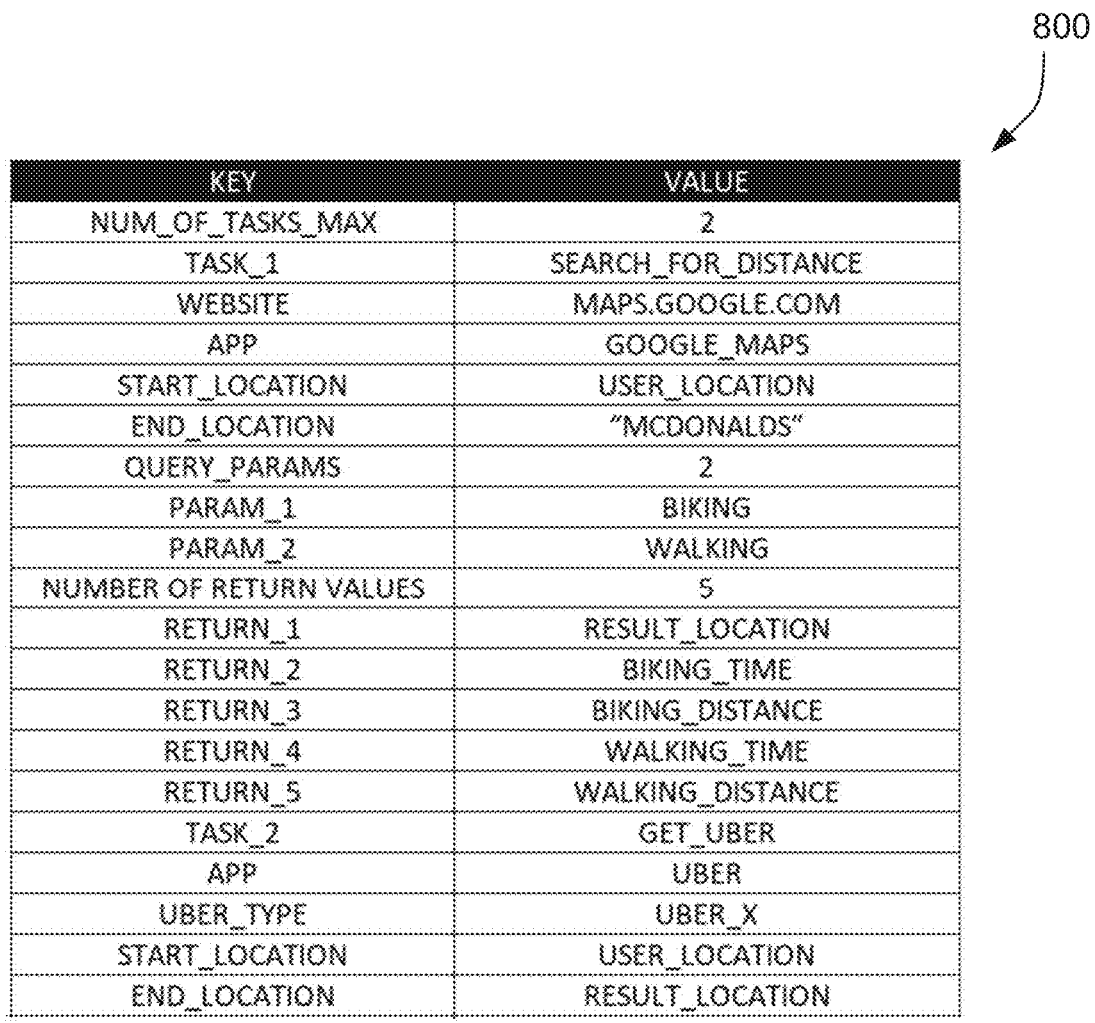

| KEY | VALUE |
| --- | --- |
| NUM_OF_TASKS_MAX | 2 |
| TASK_1 | SEARCH_FOR_DISTANCE |
| WEBSITE | MAPS.GOOGLE.COM |
| APP | GOOGLE_MAPS |
| START_LOCATION | USER_LOCATION |
| END_LOCATION | "MCDONALDS" |
| QUERY_PARAMS | 2 |
| PARAM_1 | BIKING |
| PARAM_2 | WALKING |
| NUMBER OF RETURN VALUES | 5 |
| RETURN_1 | RESULT_LOCATION |
| RETURN_2 | BIKING_TIME |
| RETURN_3 | BIKING_DISTANCE |
| RETURN_4 | WALKING_TIME |
| RETURN_5 | WALKING_DISTANCE |
| TASK_2 | GET_UBER |
| APP | UBER |
| UBER_TYPE | UBER_X |
| START_LOCATION | USER_LOCATION |
| END_LOCATION | RESULT_LOCATION |

FIG. 8

| TASK_TITLE | KEYS | ASSOCIATED_PHRASES | RECORDED_PERFORMANCE_SKELETON_ID |
|---|---|---|---|
| SEND_AN_EMAIL | TO<br>SUBJECT<br>BODY<br>CC<br>BCC<br>... | "WRITE"<br>"COMPOSE"<br>"EMAIL"<br>"PING" | 8001 |
| SCHEDULE_CAL_EVENT | TITLE<br>TIME<br>DATE<br>PARTICIPANTS<br>... | "MEET"<br>"MEETING"<br>"FIND A TIME" | 8002 |
| SEARCH_FOR_DISTANCE | START_LOCATION<br>END_LOCATION | "HOW DO I GO TO"<br>"HOW FAR AWAY IS" | 8003 |
| GET_UBER | START_LOCATION<br>...<br>END_LOCATION | "CALL A CAR"<br>"SCHEDULE A RIDE" | 8004 |
| DINING_RESERVE | LOCATION<br>DATE<br>...<br>TIME | "GET A TABLE"<br>"SCHEDULE RESERVATION" | 8005 |

FIG. 10

| STEP | KEY | VALUE | OBJECT MODEL LOCATION | ACTION |
|---|---|---|---|---|
| 1 | URL | GOOGLEMAPS | URL_LOAD(); | NULL |
| 2 | | | Body_Table_Div_DIRECTIONS | LeftClick |
| 3 | | | Body_Table_Div_TEXTFIELD1 | LeftClick |
| 4 | START_LOCATION | USER_LOCATION | Body_Table_Div_TEXTFIELD1 | TextEntry |
| 5 | | | Body_Table_Div_TEXTFIELD2 | LeftClick |
| 6 | END_LOCATION | STARBUCKS | Body_Table_Div_TEXTFIELD2 | TextEntry |
| 7 | | | Body_Table_Div_SEARCH | LeftClick |
| 8 | PARAM_1 | BIKING | Body_Table_Div_BIKING | LeftClick |
| 9 | | | Body_Table_Div_FIELD_1 | STORE |
| 10 | PARAM_2 | TRANSIT | Body_Table_Div_TRANSIT | LeftClick |
| 11 | | | Body_Table_Div_FIELD_2 | STORE |
| 12 | RETURN_1 | RESULT_LOCATION | Body_Table_Div_FIELD_A | NULL |
| 13 | RETURN_2 | BIKING_TIME | Body_Table_Div_FIELD_B | NULL |
| 14 | RETURN_3 | BIKING_DISTANCE | Body_Table_Div_FIELD_C | NULL |
| 15 | RETURN_4 | TRANSIT_TIME | Body_Table_Div_FIELD_D | NULL |
| 16 | RETURN_5 | TRANSIT_DISTANCE | Body_Table_Div_FIELD_E | NULL |

FIG. 11

| STEP | KEY | VALUE | OBJECT MODEL LOCATION | ACTION |
|---|---|---|---|---|
| 1 | URL | GOOGLEMAPS | URL_LOAD(); | NULL |
| 2 | | | Body_Table_Div_DIRECTIONS | LeftClick |
| 3 | | | Body_Table_Div_TEXTFIELD1 | LeftClick |
| 4 | START_LOCATION | USER_LOCATION | Body_Table_Div_TEXTFIELD1 | TextEntry |
| 5 | | | Body_Table_Div_TEXTFIELD2 | LeftClick |
| 6 | END_LOCATION | MCDONALDS | Body_Table_Div_TEXTFIELD2 | TextEntry |
| 7 | | | Body_Table_Div_SEARCH | LeftClick |
| 8 | PARAM_1 | BIKING | Body_Table_Div_BIKING | LeftClick |
| 9 | | | Body_Table_Div_FIELD_1 | STORE |
| 10 | PARAM_2 | WALKING | Body_Table_Div_WALKING | LeftClick |
| 11 | | | Body_Table_Div_FIELD_2 | STORE |
| 12 | RETURN_1 | RESULT_LOCATION | Body_Table_Div_FIELD_A | NULL |
| 13 | RETURN_2 | BIKING_TIME | Body_Table_Div_FIELD_B | NULL |
| 14 | RETURN_3 | BIKING_DISTANCE | Body_Table_Div_FIELD_C | NULL |
| 15 | RETURN_4 | WALKING_TIME | Body_Table_Div_FIELD_D | NULL |
| 16 | RETURN_5 | WALKING_DISTANCE | Body_Table_Div_FIELD_E | NULL |

FIG. 13

| STEP | KEY | VALUE | OBJECT MODEL LOCATION | ACTION |
|---|---|---|---|---|
| 1 | URL | UBER | URL_LOAD(); | NULL |
| 2 | | | Body_Table_Div_ORIGIN | LeftClick |
| 3 | START_LOCATION | USER_LOCATION | Body_Table_Div_TEXTFIELD | TextEntry |
| 4 | | | Body_Table_Div_DESTINATION | LeftClick |
| 5 | END_LOCATION | RESULT_LOCATION | Body_Table_Div_TEXTFIELD | TextEntry |
| 6 | | | Body_Table_Div_SEARCH | LeftClick |
| 7 | UBER_TYPE | UBER_X | Body_Table_Div_UBER_X | LeftClick |
| 8 | | | Body_Table_Div_ORDER | LeftClick |

FIG. 14

WORKFLOW INSTRUCTION INTERPRETATION FOR WEB TASK AUTOMATION

CROSS-REFERENCE TO RELATED APPLICATIONS

This disclosure is related to U.S. patent applications having Ser. Nos. 17/244,457 and 17/244,558, both filed on Apr. 29, 2021. The entirety of both applications is incorporated by reference.

FIELD

This disclosure relates to automating performance of a web task on a web page and, more particularly, interpreting a workflow instruction to perform the web task.

BACKGROUND

Web task automation refers to a process of using automation tools to execute tasks performed through an Internet browser. Some forms of web automation may be performed using a variety of web browser software running on a personal computer (such as a desktop or a laptop), a tablet, or a smart phone. Examples of web tasks may include sending an email, scheduling a calendar event, implementing a search using a search engine, searching through an inbox, scheduling a reminder, etc. Further examples include interfacing with other applications, such as Uber™, to book a ride. Further examples include interfacing with a calendar-based web application to make an appointment or to schedule a calendar event with multiple people for a specific time.

A conventional web browser is a software component that, when executed by a processor, can cause the processor to retrieve files from a remote server and generate, based on the retrieved files, a display of a web page to a user to, thereby, allow for interaction between the user and the files. These files may contain code that may be interpreted and executed, or otherwise executed—such as Hypertext Markup Language (HTML) code, Cascading Style Sheets (CSS) code, JavaScript™ code, WebAssembly (Wasm) and more. A web browser may cause the processor to implement an instance of a web engine to determine specific content to be rendered on a user interface (such as a screen) based on the files retrieved. The content may be displayed as a webview—an instance of the browser engine presented in a frame that may be native to the browser or be part of some other application. In generating the display of the web page, the browser may generate, based on the file or files retrieved from the remote server, an object model, such as a Document Object Model (DOM). An object model may contain a hierarchical tree-like structure that establishes parent-child relationships between the various elements of the web page that are to be rendered on the user interface. A browser may have additional functions and may perform other tasks within a computing system.

Many interactions between a human and a computing device involve an action completed using a Graphic User Interface (GUI). Often, such an action can include using a using a mouse, or similar component of the electronic device, to implement navigation actions and item selection actions within the interface, and using a keyboard component of the electronic device to implement text entry actions and number entry actions. To accomplish a single task on a web page, loaded using a personal computer, a user typically carries out a series of actions. On a conventional personal computer these actions may take the form of mouse actions and keyboard actions. Similarly, on a smart phone or tablet device, a user may employ a touchscreen, a voice interface or the like to accomplish both clicking and typing actions.

SUMMARY

To autonomously perform a task on a web page, a playback performance skeleton is generated. The playback performance skeleton informs a playback engine how to send action messages to a browser, wherein each action is necessary to carry out the web task.

A natural language input may be entered by a user into a user device, where the natural language input is indicative of a sequence of tasks to perform. If the natural language input is indicative of a sequence of tasks, the sequence may include conditional performance of each individual task in the sequence. The conditional performance of each task in the sequence may be based on an object model or outcome of performance of a previous task in the sequence.

According to one aspect, there is provided a computer-implemented method of arranging execution of a sequence of tasks. The method includes receiving a natural language input indicative of the sequence of tasks and generating, for the natural language input, the sequence of tasks including a first task and a conditional successive task associated with a conditionality referencing a result returned from performance of the first task. The method further includes arranging performance of the first task, determining that the result returned from the performance of the first task satisfies the conditionality and, responsive to the determining, arranging performance of the successive task.

BRIEF DESCRIPTION OF DRAWINGS

Embodiments will be described, by way of example only, with reference to the accompanying figures in which:

FIG. 8 illustrates example key-value pairs that may be extracted from the natural language input by the natural language unit of FIG. 7, according to one embodiment;

FIG. 10 illustrates an example task database;

FIG. 11 illustrates an example recorded performance skeleton, a reference to which may be stored in the task database of FIG. 10;

FIG. 13 illustrates the first playback performance skeleton referenced in the task sequence performance skeleton of FIG. 12;

FIG. 14 illustrates the second playback performance skeleton referenced in the task sequence performance skeleton of FIG. 12;

DETAILED DESCRIPTION

For illustrative purposes only, specific example embodiments will now be detailed below in conjunction with the figures.

Figure 1:
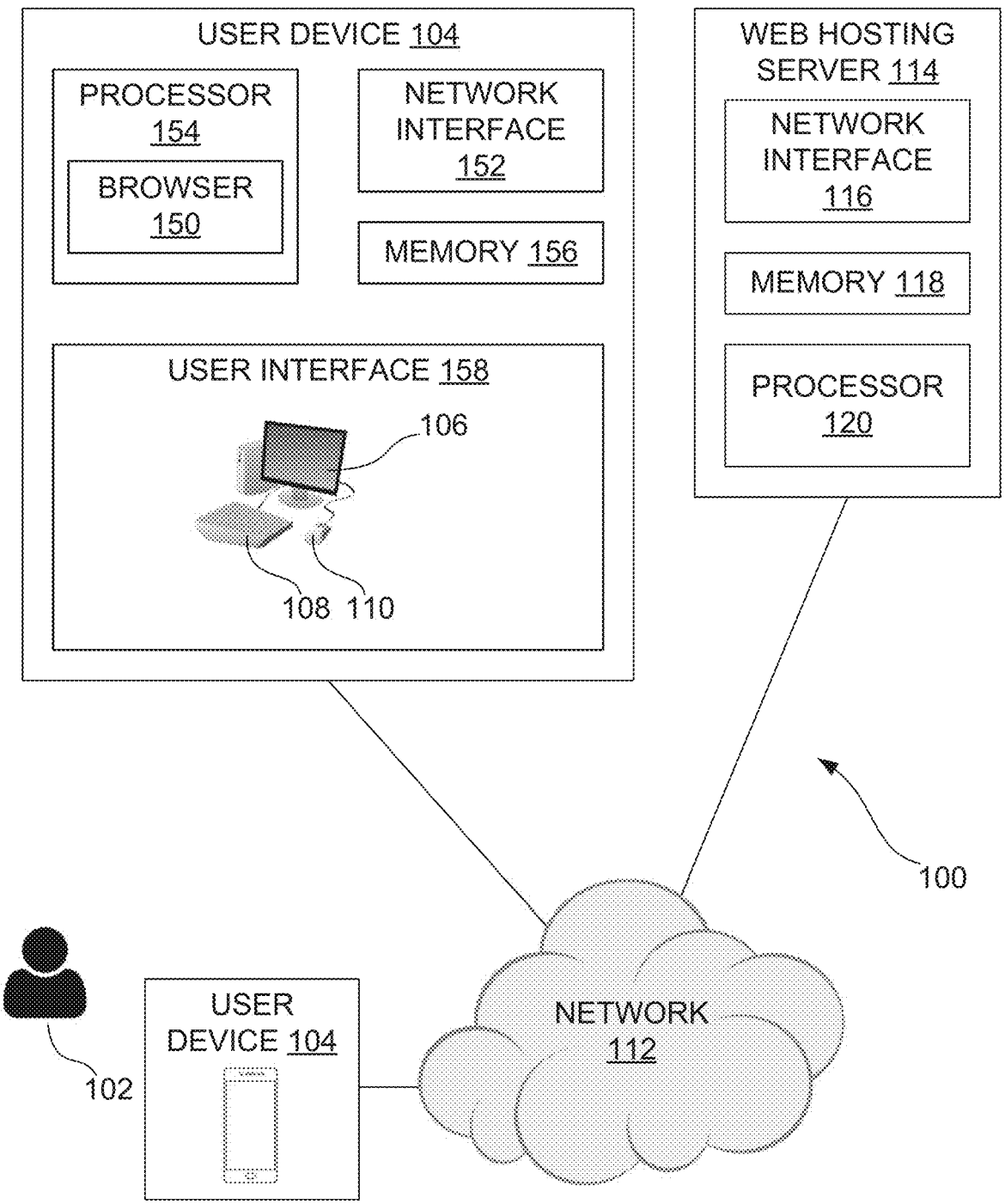
FIG. 1 schematically illustrates a system including a user device in communication with a web hosting server via a network.

FIG. 1 illustrates an environment 100 in which a user 102 may interact with an electronic computing device (a user device) 104 to load a web page available from a web hosting server 114. The actions of selecting a web page, retrieving web page data associated with the web page, rendering that data, and displaying the web page to the user is known and is often referred to as "web browsing." User device 104 can send a request over a network 112 to retrieve, from web hosting server 114, a web page. User device 104 may include a screen 106 (which may be a touch screen), a keyboard 108 and a mouse 110. User device 104 is illustrated as including a browser 150 implemented by a user device processor 154, a user device network interface 152, a user device memory 156, and a user interface 158. Web hosting server 114 is illustrated as including a web hosting server network interface 116, a web hosting server processor 120, and a web hosting server memory 118. User device processor 154 and web hosting server processor 120 may be implemented as one or more processors configured to execute instructions stored in a memory (e.g., in user device memory 156 or web hosting server memory 118, as appropriate). Alternatively, some or all of user device processor 154 and web hosting server processor 120 may be implemented using dedicated circuitry, such as a central processing unit (CPU), a programmed field-programmable gate array (FPGA), a graphical processing unit (GPU), or an application-specific integrated circuit (ASIC). Web hosting server processor 120 may directly perform or may instruct components of web hosting server 114 to perform the functions of web hosting server 114 explained herein.

According to one embodiment, network 112 may be a packet-switched data network, including a cellular network, a Wi-Fi™ network or other wireless or wired local area network (LAN), a WiMAX network or other wireless or wired wide area network (WAN), etc. Web hosting server 114 may also communicate with other servers (not shown) in network 112. Example protocols that may be used in network 112 include the known transmission control protocol (TCP) and Internet protocol (IP).

In operation, a web request sent from user device 104 indicates a web page in the form of a server resource (e.g., a location or function/operation), within web hosting server 114, to which user device 104 is requesting access. For example, a web request may be a request to receive a home web page of an online store, to receive a web page associated with a web app (such as an email web page or a calendar web page), etc. A web request from user device 104 is sent over network 112 to web hosting server 114, and is received by web hosting server network interface 116 and processed by web hosting server processor 120 having access to web hosting server memory 118. Responsive to the request, web hosting server 114 will send back to user device 104, via network interface 116 and over network 112, data for allowing user device 104 to render the web page.

Figure 2:
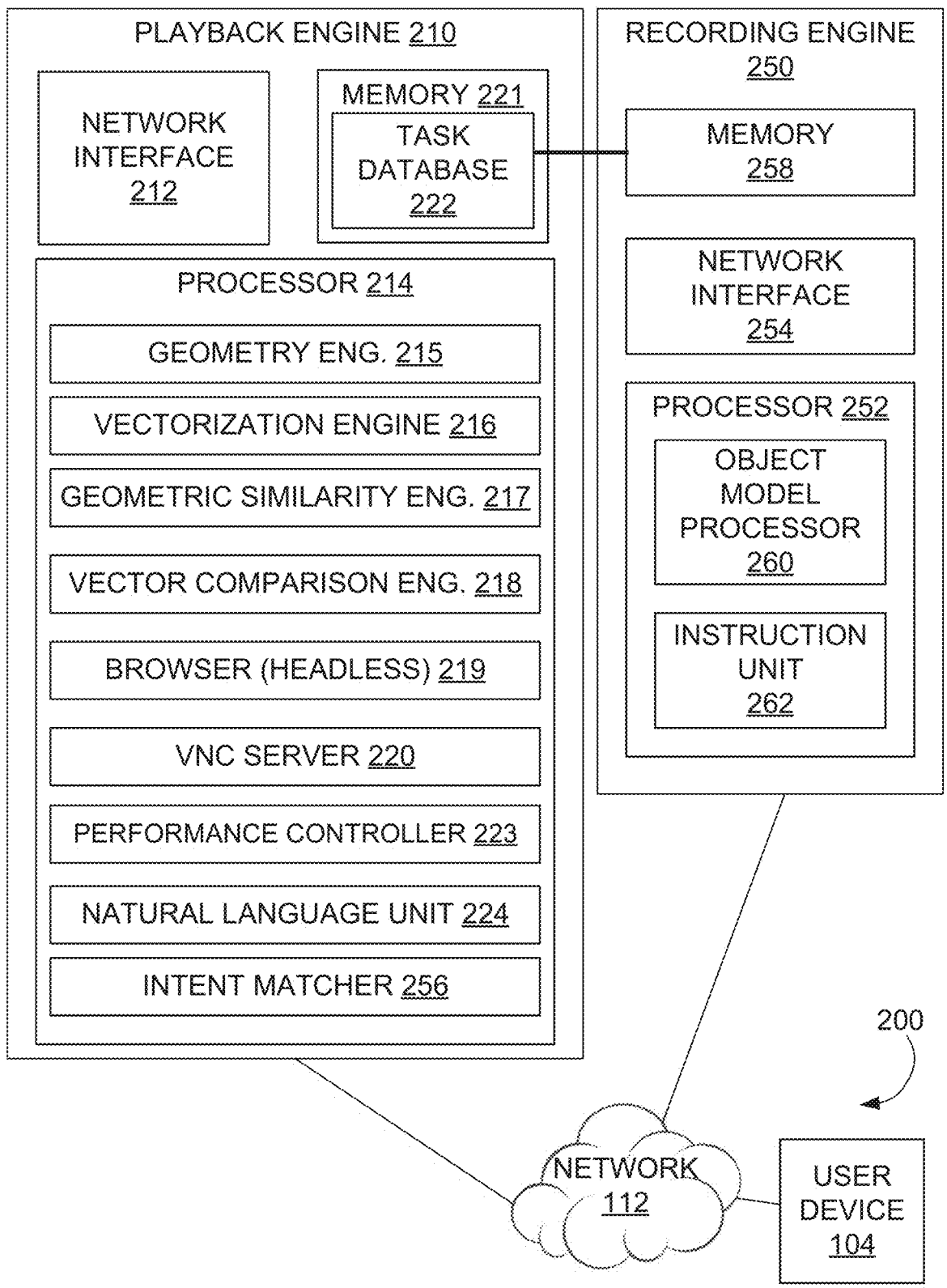
FIG. 2 schematically illustrates a system including the user device of FIG. 1, a recording engine and a playback engine, according to one embodiment.

FIG. 2 illustrates an environment 200 for carrying out a task. Environment 200 includes user device 104, which can communicate, over network 112, with a playback engine 210 and a recording engine 250. Playback engine 210 includes a playback engine network interface 212, a playback engine memory 221, and a playback engine processor 214. Playback engine processor 214 is capable of implementing a geometry engine 215, a vectorization engine 216, a geometric similarity engine 217, a vector comparison engine 218, a headless browser 219, a Virtual Network Connection (VNC) server 220, a performance controller 223 and a natural language unit (NLU) 224, and an intent matcher 256. Playback engine memory 221 of playback engine 210 includes a task database 222 that stores references to recorded performance skeletons. Recording engine 250 includes a recording engine processor 252, a recording engine network interface 254, and a recording engine memory 258. The recording engine processor 252 is capable of implementing an object model processor 260 and an instruction unit 262.

According to some embodiments, any component of playback engine 210 may be accessed by recording engine 250, and vice versa. For example, recording engine 250 may access playback engine memory 221 and task database 222 and recording engine processor 252 may execute a version of headless browser 219.

Each one of browser 150, instruction unit 262, geometry engine 215, vectorization engine 216, geometric similarity engine 217, vector comparison engine 218, headless browser 219, VNC server 220, performance controller 223, object model processor 260 and instruction unit 262 (collectively "functional blocks") may be implemented by one or more processors of user device 104, playback engine 210, and recording engine 250 that execute instructions stored in memory, e.g., in memory 221, 258, or 156. The instructions, when executed by the one or more processors, cause the one or more processors to perform the operations of the respective functional blocks. Alternatively, some or all of the functional blocks may be implemented using dedicated circuitry, such as via an ASIC, a GPU, or an FPGA that performs the operations of the functional blocks, respectively.

In operation, a user (such as user 102) may interact with user interface 158, either to provide a natural language instruction for performing a new task, or to start playback of a pre-defined task. The recording and playback will be described in relation to further figures.

Figure 3:
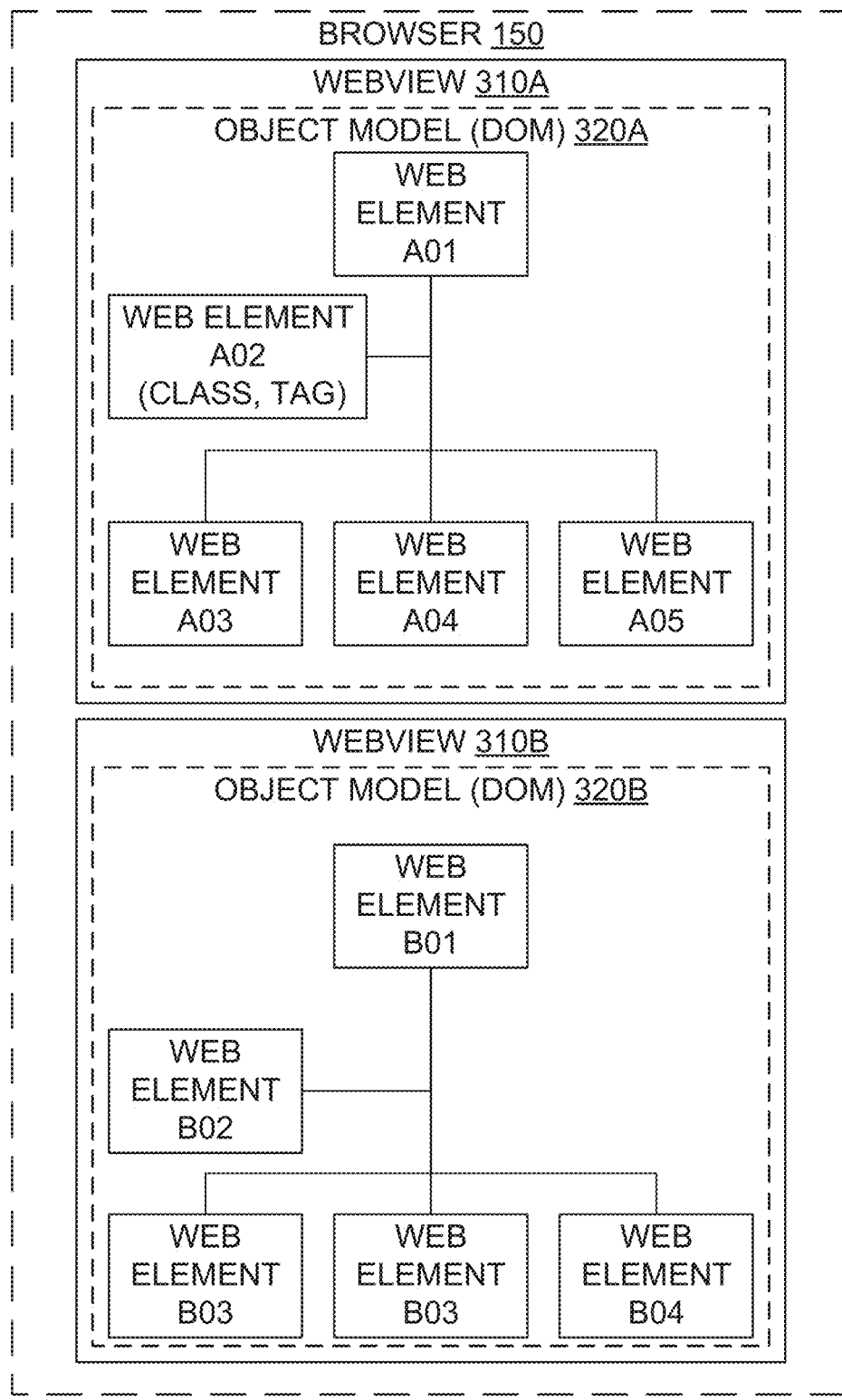
FIG. 3 illustrates a browser managing multiple webviews, according to one embodiment.

As illustrated in FIG. 3, browser 150 is illustrated as managing a plurality of webviews, including a first webview 310A and a second webview 310B (individually or collectively 310). According to some embodiments, browser 150 may manage any number of webviews 310. Each webview 310 is representative of a single rendering of content of a web page. Browser 150 requests and retrieves a first web page and a second web page from web hosting server 114. First webview 310A generates a rendering of the first web page and a first object model 320A for the first web page. Second webview 310B generates a rendering of the second web page and a second object model 320B for the second web page. The first web page is expected to have a plurality of web elements, illustrated as a web element A01, a web element A02, a web element A03, a web element A04 and a web element A05. The second web page is also expected to have a plurality of web elements, illustrated as a web element B01, a web element B02, a web element B03, a web element B04 and a web element B05. Both first object model 320A and second object model 320B can be in the form of a hierarchical tree structure, as shown in FIG. 3. First webview 310A can identify individual branches of first object model 320A using classes and tags. Similarly, second webview 310B can identify individual branches of second object model 320B using classes and tags.

Figure 4:
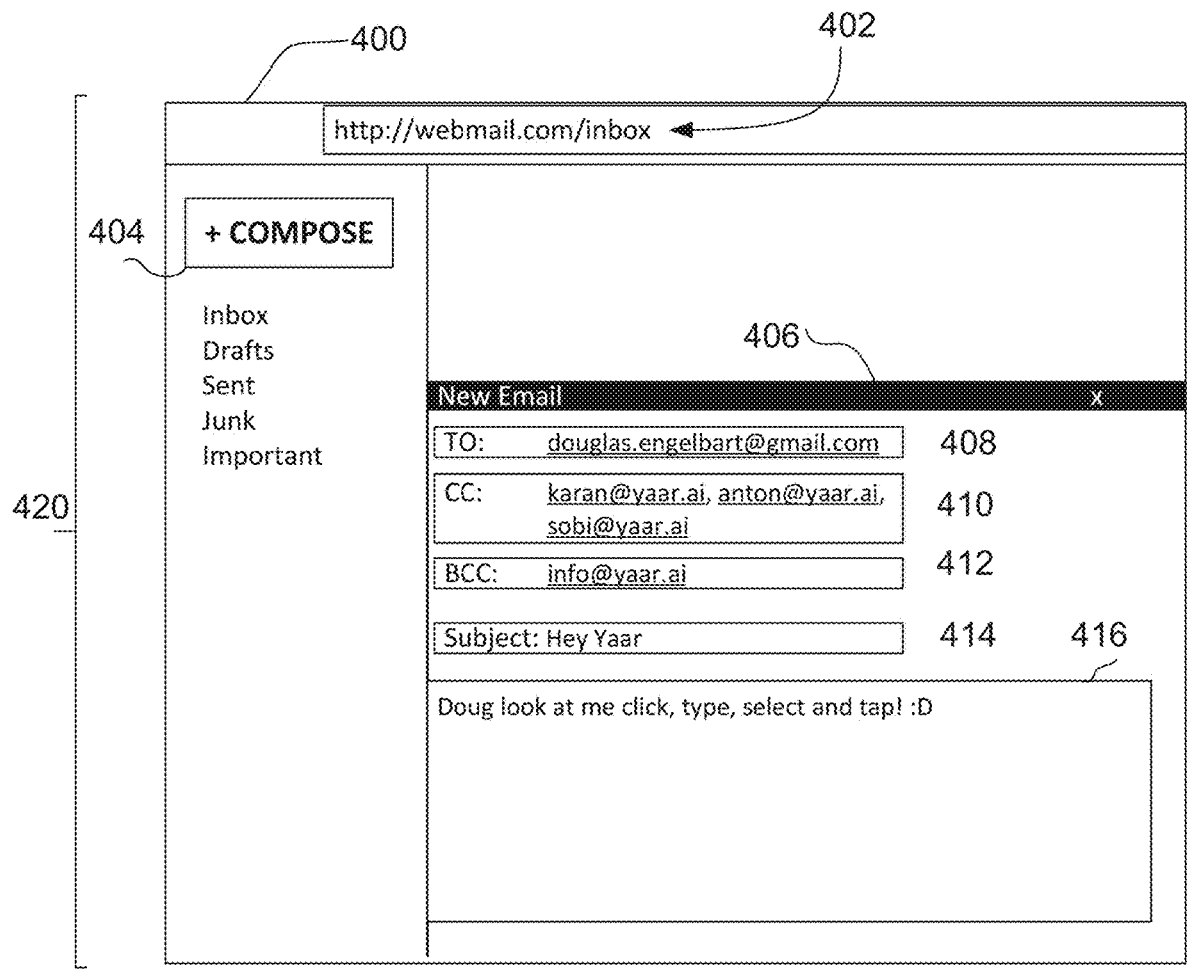
FIG. 4 illustrates a user interface of a web browser window on a specific web page made up of web elements, according to one embodiment.

FIG. 4 is an example mock-up graphic user interface of a web browser window 400, on a specific web page made up of web elements 420. The web page may be retrieved from web hosting server 114 responsive to user device 104 transmitting a request identifying the web page by a uniform resource locator (i.e., a "URL") 402. In the example of FIG. 4, URL 402 corresponds to a web page for a web mail client for sending email messages. As can be seen, the web page includes a compose button 404 and a new email message window 406, including a TO field 408, a carbon copy (CC) field 410, a blind carbon copy (BCC) field 412, a subject field 414, and a message field 416. User 102 may, in interacting with browser window 400 on user device 104, request the web page identified by URL 402, and, subsequently, click on compose button 404 to cause new email message window 406 to pop up. User 102 may then populate TO field 408, CC field 410, BCC field 412, subject field 414, and message field 416. Each of these interactions may modify the web elements in object model 320 of the web page associated with URL 402. In traditional operation, user 102 would manually populate fields 408 to 414.

A web page may instruct a browser to store data related to a browsing session or activity within the browser. This data may be saved in a memory of a user device (such as user device 104). Data stored related to a browsing session is often referred to as a cookie. An example cookie is an authentication cookie. When the user visits a website's login page using a browser, the web server may determine a unique session identifier for the browser session and instruct the browser to store the unique session identifier as an authentication cookie. If the user successfully logs in by providing an appropriate username and password, the server stores in a server-side database the unique session identifier, along with an indication that the particular unique session identifier has been authenticated (i.e., that the session is for an authenticated user). Any request from the browser to load subsequent web pages may include the address for the web page, and include any cookies related to the web page, such as the authentication cookie containing the unique session identifier. The web server hosting the web page will determine if the cookie is related to an authenticated session, and will grant the user access to its services, loading the page.

Another example cookie may be related to user preferences when loading a web page, such how a user last used a web page. If the web page is a calendar, the web page may store a cookie that could include if the calendar web page was last used in a month view (rather than a week view).

Another method of processing web content is using a headless browser. A headless browser may function similar to a browser employing webview as previously described, however may not generate graphic representations of the object models 320. Rather, a headless browser may download the content for the web page, and leave any downloaded information (e.g., the object model 320) in a data-object or text-based format, without generating any graphic representation. A headless browser may still interact with a website using clicking or typing actions, however the actions will be performed using action messages (e.g., computer code indicative of a mouse click) directly on the individual branches of the object model 320. Example headless browsers include Selenium and PhantomJS.

Cookies may be extracted from a browser 150 on a user device 104 and sent over a network to a remote web server (such as, for example, the remote web server hosting playback engine 210). The remote web server may generate an instance of a headless browser and navigate to a specific web page, using the cookies from user device 104. Thereby, the instance of the specific web page may be rendered and loaded, by headless browser 219, in a manner similar to the manner in which the specific web page would be rendered and be loaded on user device 104, however, without generation of a graphic representation. This allows headless browser 219 to load authenticated instances of a web page.

According to some embodiments, the server hosting headless browser 219 may include additional software to allow for visual rendering and remote control of the web pages used throughout playback performance. One method of rendering and remote control from a headless browser is use of a Virtual Network Computing (VNC) protocol. A VNC protocol requires use of software instructions stored on both the remote web server and user device 104 to establish a VNC connection. Accordingly, the remote web server may additionally act as a VNC server, and user device 104 may act as a VNC client.

A VNC connection will display a visual representation of the web page loaded by headless browser 219 and display the visual representation on the user device 104. User device 104 may send, through the VNC connection, specific keyboard and mouse events to web server to be performed on the web page. This connection allows for updates to be made to the visual representations based on specific events or on a specific visual update rate.

According to some embodiments, to generate a VNC server instance with playback engine 210, playback engine 210 may be containerized as its own playback server. Therefore, each VNC server instance is bound to a single, containerized, task-specific instance of playback engine 210 having an accessible address. Upon completion of a task, the task-specific VNC instance and the playback container are deleted.

Since the task-specific VNC instance is accessed over a network via a unique URL, the unique URL can be opened in a browser's WebView in order to display the VNC contents on a device (a laptop computer, a mobile phone, etc.). According to some embodiments, the unique URL may only be accessed temporarily. That is, the unique URL may expire after the task is completed. The expiry establishes that malicious users will be unable to see the contents of the task-specific VNC instance from another user's performance. Once the WebView displays the contents of the task-specific VNC instance, the users can interact with the playback server by clicking and typing on the VNC, controlling the VNC on the WebView in the same fashion a user would interact with a web page loaded without the use of VNC. Any data required by the playback server can also be signaled visually by injecting code into the task-specific VNC instance to modify the visual representation. For example, if playback engine 210 indicates that a text entry field is necessary, the VNC server may superimpose a yellow highlight over a region including the text entry field. A user can respond to the changes requested by playback engine 210 by interacting with the WebView displaying the contents of the task-specific VNC instance through clicking and typing actions. As another example, a given user can choose to intervene and select a cheaper Uber transportation or cancel booking a ride altogether if the given user feels that the fare price is too costly. The task-specific VNC instance may, in some embodiments, include a timeout functionality to stop task performance if a certain amount of time has passed. This timeout functionality is intended to prevent network congestion in the event the user has lost connection or is, for some reason, unable to complete the input.

Figure 5:
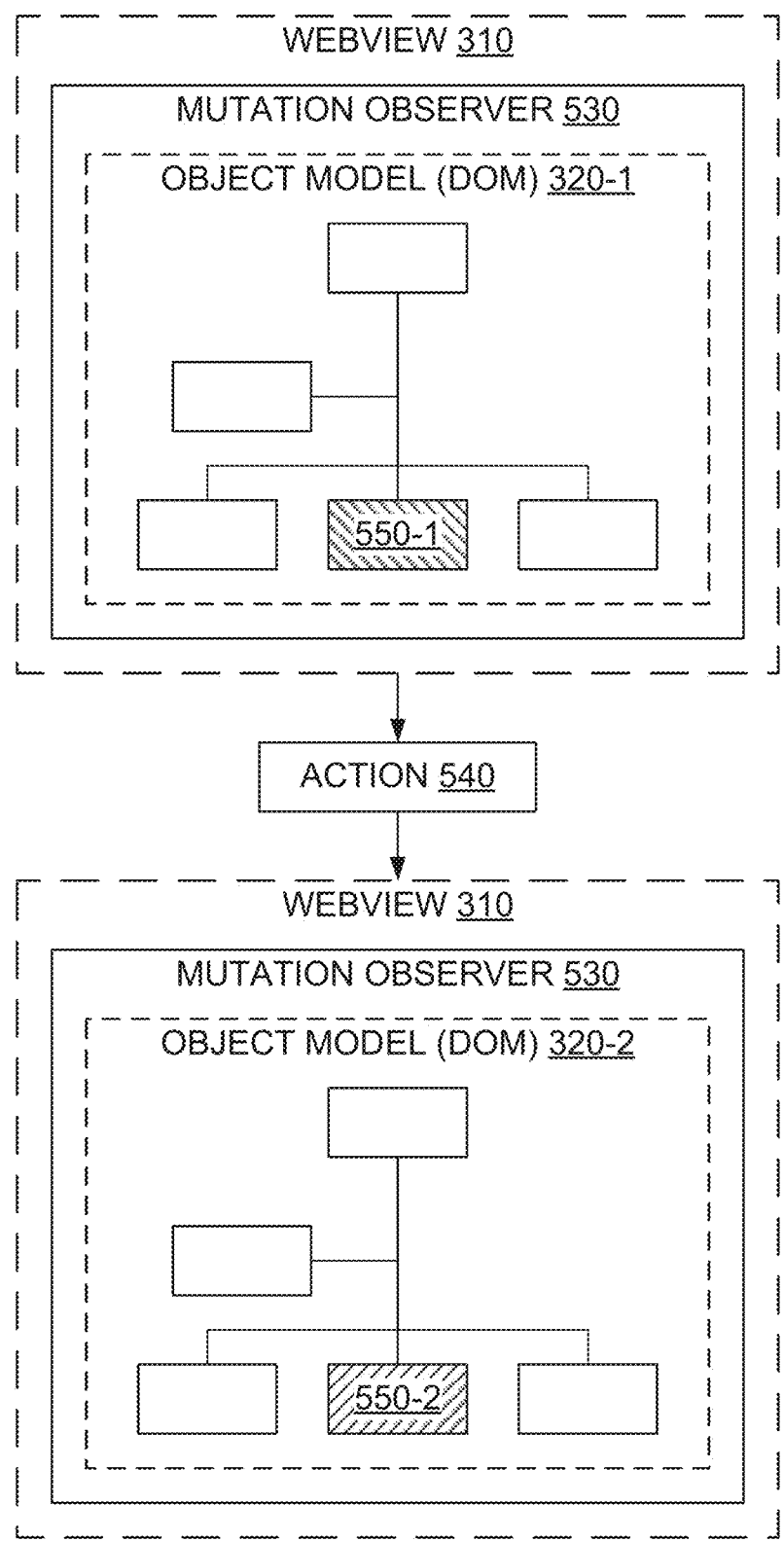
FIG. 5 illustrates a model of a manner in which components executed on the user device of FIG. 1 may track changes on a web page, according to one embodiment.

FIG. 5 illustrates a model of tracking changes on a web page, according to one embodiment. According to this embodiment, a mutation observer 530 is employed to detect a change in an initial object model 320-1, which has been generated by a webview or generated by a headless browser. Responsive to an action 540 having taken place, FIG. 5 illustrates that a given web element differs between an initial given web element 550-1 in initial object model 320-1 and an updated given web element 550-2 in an updated object model 320-2. Action 540 may be seen to have caused webview 310 (or headless browser 219) to generate updated object model 320-2. The mutation observer 530 can detect that updated object model 320-2 is distinct from initial object model 320-1 and can identify that the change was in initial given web element 550-1. Action 540 that caused the change from initial object model 320-1 to updated object model 320-2 may have been a user input event, such as clicking, typing, hovering, scrolling, etc. Action 540 can also have been a change in the web page itself, such as a new email having been received in an inbox, any other web element changing based on any user input or an internal piece of software designed to cause initial object model 320-1 to become updated object model 320-2.

Figure 6:
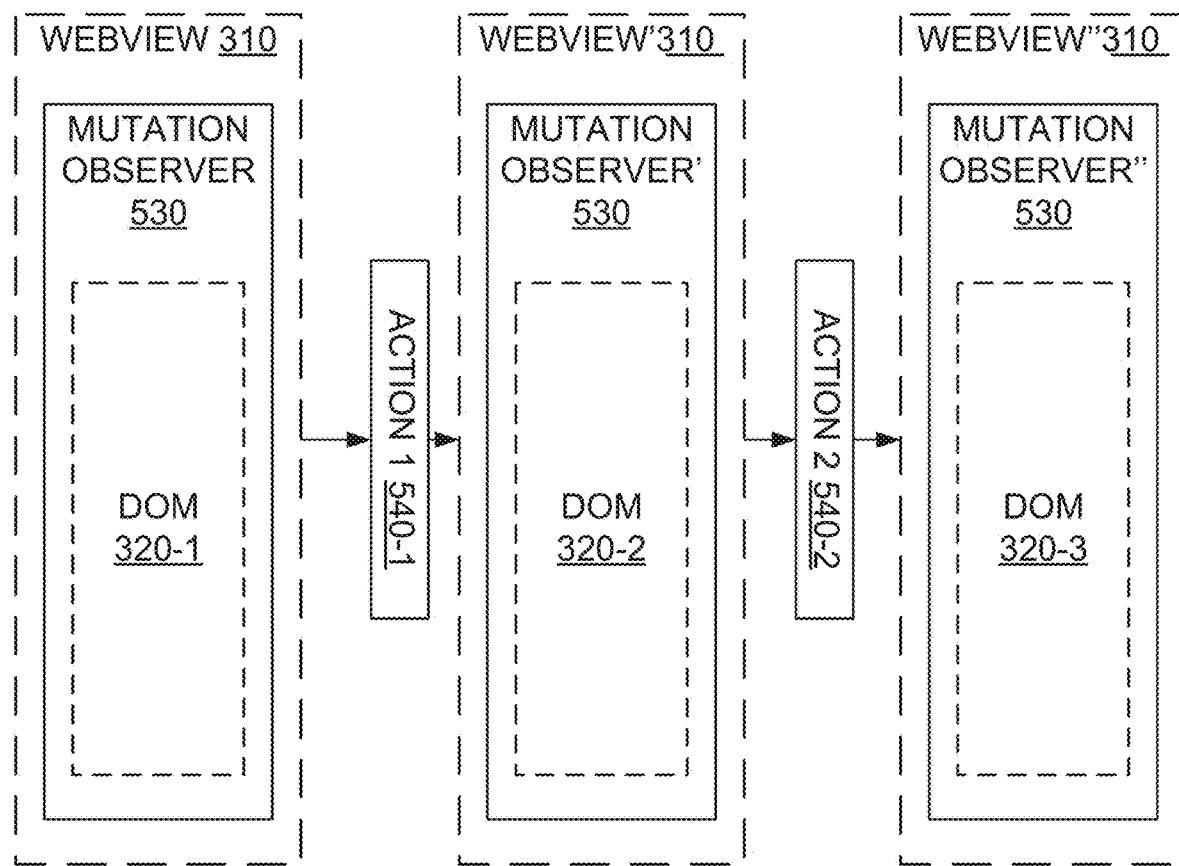
FIG. 6 illustrates a model of a manner in which components executed on the user device of FIG. 1 may track changes on a web page, according to another embodiment.

FIG. 6 illustrates a model of tracking changes on a web page in the webview 310 or in headless browser 219, according to another embodiment. In FIG. 6, multiple actions (a first action 540-1 and a second action 540-2) have occurred, changing an object model from initial object model 320-1 to a once-updated object model 320-2 and, finally, to a twice-updated object model 320-3. Mutation observer 530 detects a change from initial object model 320-1 to once-updated object model 320-2 caused by first action 540-1. Mutation observer 530 also detects a change from once-updated object model 320-2 to twice-updated object model 320-3 caused by second action 540-2. These changes and representations of initial object model 320-1, once-updated object model 320-2, and twice-updated object model 320-3 can be stored in a memory.

Aspects of the present application relate to using playback engine 210 (FIG. 2) to control performance of a given task on a web page. Playback engine 210 is responsible for causing performance of the given task at browser 150 or at headless browser 219. The browser will send, to playback engine 210, an indication of task data, wherein the task data has a plurality of attributes (such as an email recipient, a subject message, body message, etc.) and browser cookies relating to user credentials.

Figure 7:
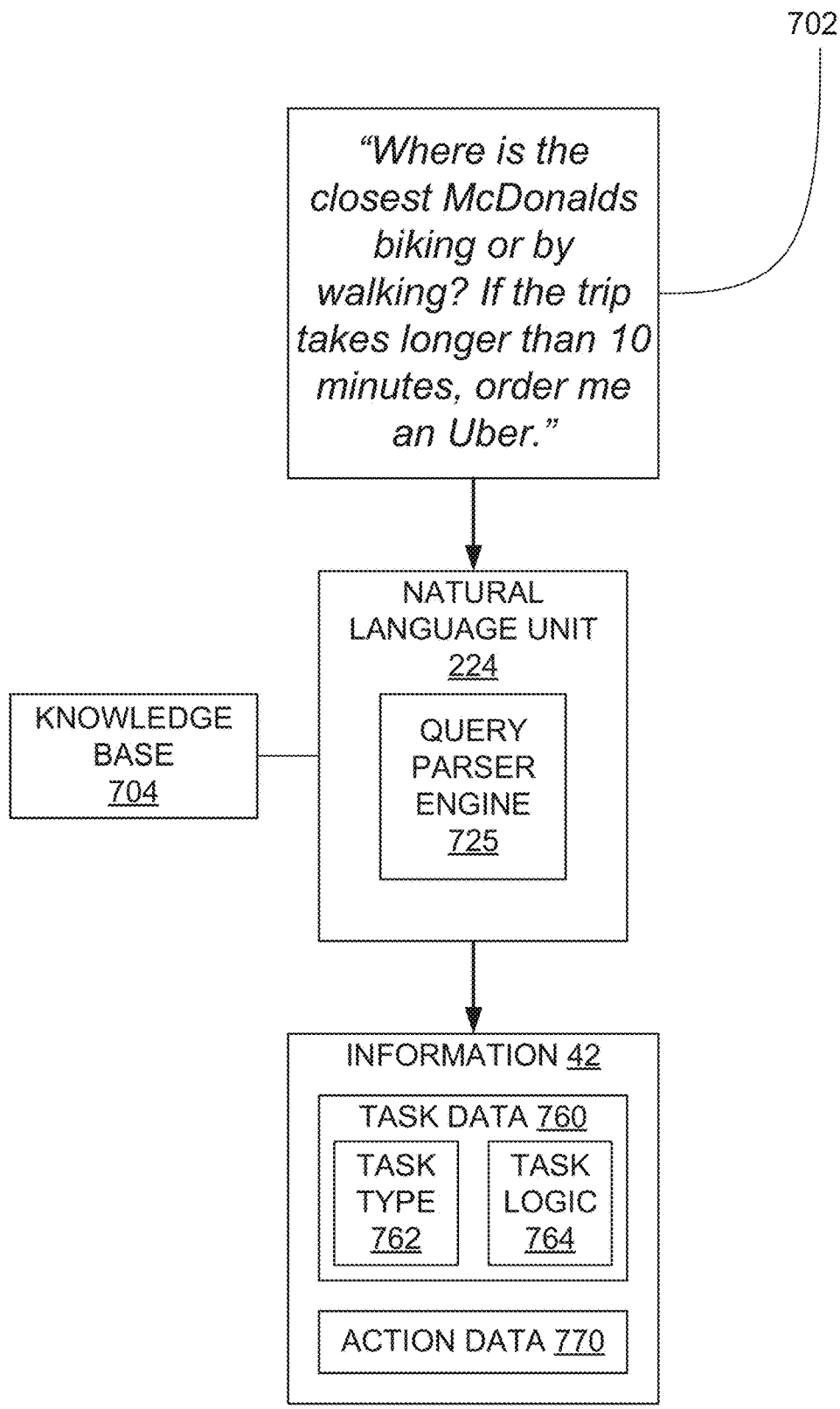
FIG. 7 illustrates receipt, by a natural language unit, of natural language input so that the natural language unit may derive, from the natural language input, information about a task to be carried out, according to one embodiment.

FIG. 7 illustrates receipt, by NLU 224, implemented by playback engine 210 (see FIG. 2), of a natural language input 702. According to some embodiments, NLU 224 receives natural language input 702 from user 102 via user interface 158 of user device 104. Natural language input 702 is expected to be indicative of a task or sequence of tasks to be carried out on one or more web pages. Natural language input 702 can further include conditionality for the performance of each task in the sequence of tasks. As can be seen, natural language input 702 illustrated in FIG. 7 is the text "Where is the closest McDonalds walking or by bike? If the trip takes longer than 10 minutes, order me an Uber." This indicates a conditionality for the "order me an Uber" task. It may be readily understood that, in this example, the conditionality "walking or biking is longer than 10 minutes" may be true or false.

NLU 224 includes a query parser engine 725 that is configured to derive, from natural language input 702, information 42 about the task to be carried out. Information 42 may include specific task data 760, such as a task type 762 and a task logic 764 for use in various decision-making processes, along with action data 770 related to individual actions that are to occur during the carrying out of the task. Task type 762 may be indicative of the type of task to perform, e.g., a type associated with a recorded performance skeleton to use in performing the task. Task logic 764 may be used in the case where natural language input 702 includes a sequence of tasks to perform, indicating how each task should be carried out, and identifying a final end task (for example, how/if a calendar event should be scheduled based on the response to an email), if decisions should be made in automation. Action data 770 may include specific values to be used for the task, organized in key-value pairs. Action data 770, in the form of key-value pairs, may be extracted from natural language input 702 using a text analysis algorithm. Known text analysis algorithms include general-purpose language representation models, such as the "distilBERT" model or the Dual Intent Entity Transformer (DIET) model.

According to some embodiments, included with natural language input 702 may be any cookies on the browser 150 implemented at user device 104 associated with the web page or cookies on headless browser 219 implemented at playback engine 210.

According to some embodiments, NLU 224 may return, to user device 104, a query requesting additional information that may assist NLU 224 when generating information 42. The request may be displayed as a prompt on screen 106 of user device 104, the prompt allowing user 102 to input additional information. The prompt may be in the form of a request for additional text input, a button, or any other option field (radio button, etc.). After receiving user input, providing additional information, user device 104 may communicate, to NLU 224, the additional information.

As another example, a natural language input may be related to a sequence of tasks for sending email messages within a web email client, then, based on received responses to the email messages, scheduling a calendar event:

Send an email through Gmail™ to James, Jordan, and Kevin. The subject line should be "Meeting on Wednesday" and the body text should invite them to a meeting at my office Wednesday afternoon at 2 PM. If everyone responds affirmatively, enter a calendar event in my Google Calendar™ for that time inviting all of them.

Query parser engine 725 may use auxiliary information that may not be present in natural language input 702. For example, query parser engine 725 may use auxiliary information specifying that a starting location for a distance query or Uber™ order should be the user's present location as determined by user device 104. Auxiliary information used to supplement natural language inputs may be stored in a knowledge base 704. Other examples of auxiliary information could include stored addresses (for "home," "work," etc.), stored contact information for individuals or groups, stored preferences for restaurants, previous natural language queries, etc.

FIG. 8 illustrates an example of action data 770, in the form of a database 800 of key-value pairs that may be extracted from natural language input 702. A key-value pair includes a key in a key column 802 and a value in a value column 804. Database 800 of key-value pairs is presented in the form of a table populated with example data for illustrative purposes. As can be seen, the key-value pairs in database 800 are for use in searching for the location of "McDonalds™" in Google Maps and returning the distance and time for walking and biking. In operation, query parser engine 725 may generate key-value pairs relating to the tasks to be included in a sequence. According to some embodiments, a key-value pair associated with a downstream step in a sequence of steps may be related to a key-value pair associated with an earlier step. For each key in key column 802, a corresponding value is provided in value column 804. The key represents a variable for the task operation and the value represents a value corresponding to the key.

Returning to FIG. 7, according to some embodiments, for some ambiguous natural language inputs, NLU 224 can first attempt to narrow down a target task using knowledge base 704. Knowledge base 704 may further include a memory including instructions for interpreting specific elements within a natural language input, such as, for example, knowing that "my office" refers to a specific address. Knowledge base 704 may also be used to determine the most appropriate suggestions to be presented to a user. For example, if asked to find a coffee shop, using locational data to find those coffee shops close to the user based on a stored location. As another example, if user inputs, as a natural language input, "Send a meeting invite to the HR team at the office for tomorrow," knowledge base 704 may have enough information for NLU 224 to fill in details, such as a complete address of "the office," a list of people belonging to "the HR team," with their corresponding email addresses, and a time to have the meeting based on the previous times that the user has had meetings with the HR team.

According to some embodiments, knowledge base 704 may comprise a plurality of database entries for an individual user 102. Entries may be structured in a relational or graph database. These database entries in knowledge base 704 may be sourced from a social media account (such as Facebook™, Twitter™, Instagram™, WhatsApp™, Slack™, etc.) or may be generated based on a user input. Each social media account may be used to determine preferences and information about a user 102. For example, knowledge base 704 may indicate that user 102 interacts with a person having multiple titles or nicknames. For example, the same contact entitled "Alexander" in an email web app may be called "Alex" in slack and "Dad" in WhatsApp.

If the database entries are stored in a graph database, various relational evaluation metrics may be employed, such as Jaro distance, Levenshtein distance, Jaccard index, etc. Based on these relational evaluation metrics, knowledge base 1306 may determine whether certain social media accounts belong to the same person. For example, knowledge base 704 may be structured to determine the distance between two nodes, one node derived from a Twitter account and one node derived from an Instagram account. If the calculated distance between two nodes is below a threshold, knowledge base 704 may group the two accounts as relating to the same contact.

Additional information that may be stored in knowledge base 704 may include:
 user's current location;
 work locations;
 home locations;
 locations that the user visits regularly;
 twitter handles;
 time zones;
 preferred languages;
 preferences for virtual meetings;
 preferences for in-person meeting (locations, coffee/breakfast/lunch/dinner, name, address and others);
 life events (new job, anniversary, recently moved, new home, sold home, away from family, away from hometown);
 relationship status (long-distance, open relationship, separated, single, married, widowed, complicated, new relationship, new parent, expecting parent, parent with a toddler and others);
 household composition (family-based household, housemate-based household and others); and
 any other potentially relevant data in automated communications.

Additionally, more attributes may be stored in knowledge base 704 relating to contacts of a user 102, for example:
 the relationship to the user (e.g., sister, colleague, roommate, etc.);
 home address;
 office location;
 work;
 education;
 languages;
 generation (baby boomer, generation X, millennial, generation Z);
 birthday;
 gender; and
 if the contact is part of any team at the user's office and others.

Information in knowledge base 704 may grow as the user uses the source social media applications, as well as through the user's natural language inputs 702 over time. Information may be periodically updated or confirmed by the user over time. For example, information about a user's office location may be updated as the system determines a user might have switched jobs. Additionally, new information may be added to an entry in the knowledge base for the user, such as "has pet."

An another example, if the natural language input relates to finding a coffee shop, query parser engine 725 may use locational data to find coffee shops close to the user based on a determined location or based on a location stored in knowledge base 704. NLU 224 may, additionally, be configured to search the web to look for resources and references related to the coffee shop. NLU 224 can also, in some cases, communicate signals to user device 104 to display, to user 102 on user interface 158, a plurality of structured input options from which a single structured input may be selected.

NLU 224 may also be configured to interpret natural language input as representative of a sequence of tasks. For example, if a first task in a sequence of tasks relates to sending an original email message with a message body that includes text that seeks to determine whether a meeting time is acceptable to the recipient, NLU 224 may be configured to anticipate reception of a response message that is a reply to the original email message. NLU 224 may then, upon analyzing the response message, make a determination as to whether the response message included an affirmative reply, a negative reply, or a reply with a suggestion for an alternative time. Based on this determination, further tasks in the sequence may be performed. For example, in the example wherein the first task in the sequence of tasks is to send the original email with the message body that includes text that seeks to determine whether a meeting time is acceptable to the recipient, upon determining that that the response message from a recipient indicates the time is good (an affirmative reply), the NLU 224 may proceed to the next task in the sequence of tasks, which may be related to generation of a calendar event and an invitation. NLU 224 may be further configured to assess whether a conditionality for the next task in the sequence has been met.

Natural language input may include multiple sentences, clauses and logical operands for performance of a task. For example, an alternative natural language input to natural language input 702 illustrated in FIG. 7 could include logical operators such as "if the driving time is less than five minutes, then tell me the walking time." Alternative logical operators may be "and," "or," or any others that may suit a task.

Figure 9:
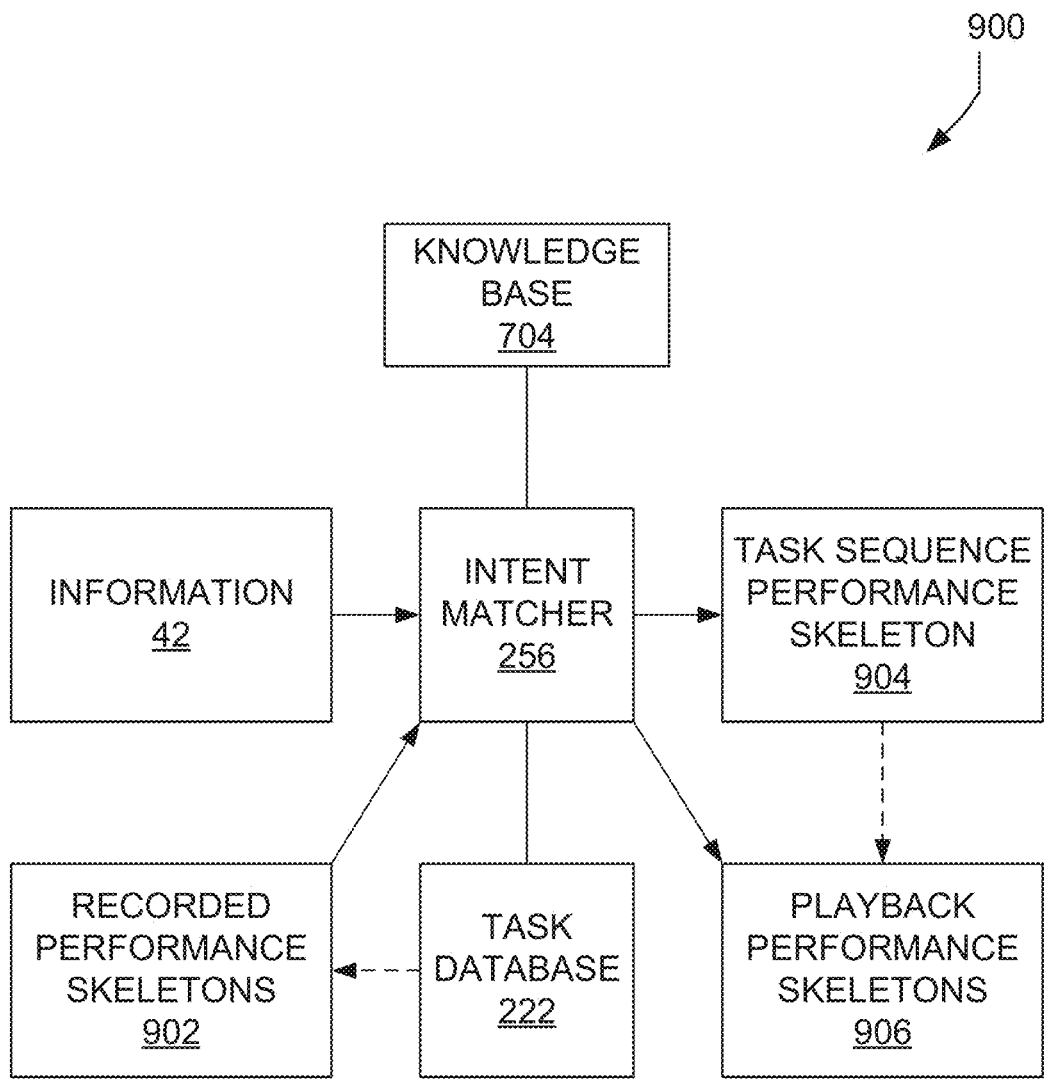
FIG. 9 illustrates components involved in generation of a task sequence performance skeleton by an intent matcher based on the information derived in FIG. 7.

FIG. 9 illustrates a model 900 including intent matcher 256 (FIG. 2) implemented by playback engine processor 214 (FIG. 2). In operation, information 42 (see FIG. 7) is provided to intent matcher 256, which has access to task database 222 (FIG. 2) storing references to a plurality of recorded performance skeletons 902.

According to some embodiments, if intent matcher 256 determines that there is missing or ambiguous data in information 42 (by comparing information 42 to the recorded performance skeletons 902), intent matcher 256 may access knowledge base 704, may access the Internet, or may generate a prompt or push notification on user device 104, prompting user 102 to provide supplemental information.

On the basis of information 42 and, perhaps, supplemental information, intent matcher 256 may select one or more recorded performance skeletons from among the recorded performance skeletons 902. Intent matcher 256 may then use information 42 to edit the selected recorded performance skeletons to generate a plurality of playback performance skeletons 906. Intent matcher 256 may then organize playback performance skeletons 906 in a task sequence performance skeleton 904, where task sequence performance skeleton 904 includes references to playback performance skeletons 906. FIG. 10 illustrates an example task database 1022 in the form of a table. Example task database 1022 serves as an example of task database 222 illustrated in FIG. 2 and FIG. 9. Example task database 1022 may be stored in playback engine memory 221 of playback engine 210 (as illustrated for task database 222 in FIG. 2). Example task database 1022 stores, in each row 1000, a reference to a recorded performance skeleton among recorded performance skeletons 902 (FIG. 9). As can be seen, each row 1000 in example task database 1022 includes an entry in a task title column 1002, one or more entries in a keys column 1004, one or more entries in an associated phrases column 1006, and an entry in a unique ID column 1008.

In operation, a particular entry in task title column 1002 or a particular entry in unique ID column 1008 may be used throughout any software operation to identify and select the particular recorded performance skeleton associated with the particular entry. For each row 1000, corresponding to a particular recorded performance skeleton among recorded performance skeletons 902 (FIG. 9), specific entries in the keys column 1004 may be employed by intent matcher 256 to generate playback performance skeletons 906. For example, in the row 1000 with "SEND_AN_EMAIL" in the task title column 1002, an employable entry in keys column 1004 includes a TO recipient. Entries in associated phrases column 1006 may be used by intent matcher 256 as instructive keywords to assist the intent matcher 256 to select a specific row 1000 in example task database 1022, where the task associated with the specific row 1000 is likely to have been intended in natural language input 702, which was converted to information 42 by NLU 224.

Turning to FIG. 11, an example recorded performance skeleton 1100, to be found among recorded performance skeletons 902 (FIG. 9), is illustrated in the form of a database. Example recorded performance skeleton 1100 may be stored in playback engine memory 221 and accessed via the unique ID entry stored in unique ID column 1008 of example task database 1022. Example recorded performance skeleton 1100 represents a sequential set of actions. Each action in the sequence of actions is identified in an action column 1108 indexed in a step column 1102. According to some embodiments, a recorded performance skeleton may be generated from any web page having an object model.

In the generation of example recorded performance skeleton 1100, each action in the sequence of actions has been observed, by object model processor 260, being carried out to perform a particular task on a particular web page. Recall, from FIG. 3, that an object model is made up of web elements. Upon observing a text entry action into a web element (such as, for example, an action involving text entry of an email address into a TO field web element), object model processor 260 is expected to have recorded a key in a key column 1103 and a value in value column 1104. An index, in step column 1102, indicates the order in which each action, referenced in action column 1108, was taken and an xPath, in an object model location column 1106, references a location of the web element on which the action was taken.

Example recorded performance skeleton 1100 of FIG. 11 is configured to obtain, using the known Google Maps™ application, an estimated time to bike to, and an estimated time to take transit to, a Starbucks™ location. Entries in step column 1102 provide an index to an order for sequentially carrying out actions in action column 1108 for each object model web element with an xPath referenced in object model location column 1106. An action in action column 1108 could be a mouse/cursor action (such as a left click, a right click, a drag-and-drop, hover, scroll, a double click, a scroll, a navigation action, etc.) or a text entry action. An action in action column 1108 may require an input variable from value column 1104 corresponding to a key in key column 1103.

For example, as can be seen in the row having an index, in step column 1102, with a value of 4, an action (a text entry action) in action column 1108 has been recorded being performed on an object model web element referenced in object model location column 1106 with xPath "Body_Table_Div_TEXTFIELD." The row having index 6 is related to a text entry action, as indicated in action column 1108, and the variable "Starbucks," has been recorded in value column 1104, corresponding to the key "LOCATION" in key column 1103.

According to some embodiments, example recorded performance skeleton 1100 may be a recorded conditional performance skeleton. In such embodiments, individual actions in action column 1108 may only be performed on the condition that the object model web element identified, by xPath, in object model location column 1106 occurs in the website, thereby meeting a conditionality for specific action performance.

According to some embodiments, a recorded performance skeleton may include additional commands or structure similar to a Turing-complete programming language, to be used in task performance. For example, the recorded performance skeleton may include an instruction including a conditionality, such as an if statement, for performance of a specific action. Additionally, the recorded performance skeleton may include instructions to perform functional loops, such as a while loop or a for loop, indicative of repeating specific actions until a conditionality is satisfied.

Figure 12:
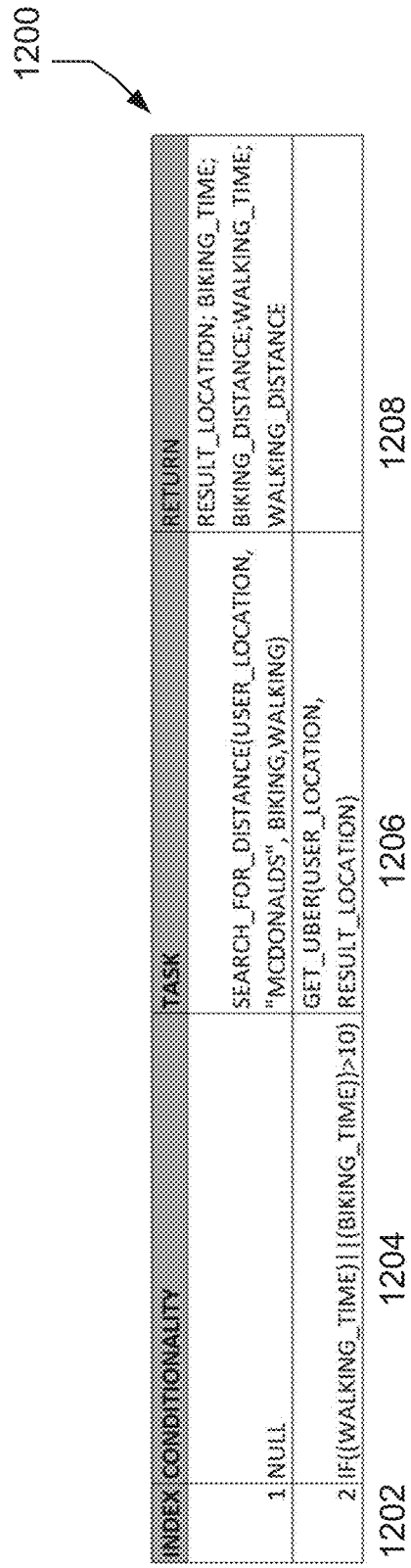
FIG. 12 illustrates an example of the task sequence performance skeleton generated by the intent matcher of FIG. 9, task sequence performance skeleton referencing a first playback performance skeleton and a second playback performance skeleton, in accordance with aspects of the present application.

FIG. 12 illustrates an example task sequence performance skeleton 1200 representative of a sequence of tasks and possible next tasks. Example task sequence performance skeleton 1200 is an example of task sequence performance skeleton 904 illustrated in FIG. 9. Each task may be referenced in a task column 1206 and performed in an order represented by entries in an index column 1202. The tasks referenced in task column 1206 may be represented by a function-call having information related to input variables in a value column of a corresponding one of playback performance skeletons 906. As discussed hereinbefore, the playback performance skeletons may be based on a selected recorded performance skeleton, such as example recorded performance skeleton 1100 of FIG. 11.

Example task sequence performance skeleton 1200 may be generated, by intent matcher 256, based, in part, on information 42, as illustrated in FIG. 9. Intent matcher 256 may determine, for each task referenced in task column 1206, whether a conditionality entry should be added to a conditionality column 1204.

During playback, the task referenced in task column 1206 associated with the entry in index column 1202 may only be performed if the conditionality found in conditionality column 1204 is satisfied. As can be seen, according to some embodiments, a task referenced in task column 1206 may generate one or more return variables, which may be seen in a return column 1208, and receive input variables for performance. Example task sequence performance skeleton 1200 includes reference to two playback performance skeletons. One playback performance skeleton (discussed hereinafter in reference to FIG. 13) is related to determining travel times and another playback performance skeleton (discussed hereinafter in reference to FIG. 14) is related to ordering a ride using a ride-sharing application, such as Uber™.

According to some embodiments, conditionalities found in conditionality column 1204 may be based on variables returned from performance of a task associated with a first playback performance skeleton. As illustrated in FIG. 12, the performance of the second task is conditional upon variables returned from the performance of the first task, where the first task involves determining the walking time and the biking time. The conditionality for the second task involves determining whether the performance of the first task has returned a value that is greater than "10" (representing minutes). According to some embodiments, a conditionality in conditionality column 1204 may be based on information derived from user device 104. For example, playback engine 210 may receive an indication, from user device 104, of the receipt, or contents, of an email message, or the receipt, or contents, of a push notification in a notification pane. Push notifications may also indicate performance of a task. Extracted information based on the first task performance or information on user device 104 may be used as input variables for the playback performance skeleton of a next task in task sequence performance skeleton 1200.

FIG. 13 illustrates a first example playback performance skeleton 1300, according to one embodiment. First example playback performance skeleton 1300 of FIG. 13 is related to a task that is similar to the task related to example recorded performance skeleton 1100 of FIG. 11. The difference between these two examples is that, rather than time to bike and time to take transit to a Starbucks™ location, first example playback performance skeleton 1300 of FIG. 13 is configured to determine a time to walk and a time to drive to a McDonalds™ location.

For each task referenced in task column 1206 in example task sequence performance skeleton 1200 of FIG. 12, a playback performance skeleton may be generated. First example playback performance skeleton 1300 is in the form of a table and is populated with example data for illustrative purposes. A plurality of playback performance skeletons may each be considered to be a portion of a task sequence performance skeleton, generated by intent matcher 256 using information 42 (derived, by NLU 224, from natural language input 702) and recorded performance skeletons 902. Notably, recorded performance skeletons 902 may include conditional recorded performance skeletons. First example playback performance skeleton 1300 includes the same information as included in example recorded performance skeleton 1100: indexes in a step column 1302; keys in a key column 1304 with corresponding values in a value column 1305; xPaths in an object model location column 1306; and actions in an action column 1308. Intent matcher 256 may replace values in the value column 1104 of the recorded performance skeleton 1100 with values included in information 42. According to some embodiments, first example playback performance skeleton 1300 may be understood to include ordered references to actions, in action column 1308. The referenced action may serve as the basis for action messages and next action messages to be sent from performance controller 223 to, for example, headless browser 219.

According to some embodiments, playback engine 210 may use a VNC protocol to establish a connection from playback engine 210 to the user device 104 to arrange task performance. The VNC connection may be used fully or partially during playback performance. A VNC connection may allow for a user to interfere/terminate a task in certain scenarios, such as involving monetary decisions or decisions benefitting from additional input, e.g., booking a ride on Uber™ or choosing a calendar event. In this scenario, an example recorded performance skeleton (not specifically shown) may include a final action to be clicking on the "Request Uber" button in a user interface. During the playback phase, if a user requests a ride during rush hour, playback engine 210 may detect that the web page includes a description stating that fare prices have surged. In such a scenario, the recorded performance skeleton may be configured to alert the user and establish a VNC connection to display the object model as stored and updated in headless browser 219. An alert may be in the form of a push notification. The VNC connection may render, on a user device, the object model established by headless browser 219 and allow the user to view the fare prices and use device 104 to perform the final action. A final action, in this scenario, may be performed by the user to select a certain fare or to abandon task performance altogether.

According to some embodiments, selection, by playback engine 210, of the web element referenced in object model location column 1306 upon which to perform the action in action column 1308 in first example playback performance skeleton 1300 may be accomplished using an algorithm to determine web element similarity. The algorithm may perform a vectorization analysis or a geometry analysis to select a particular web element on a new web page, where the particular web element has an xPath that has the greatest similarity to the xPath, in object model location column 1306, of a known web element on a known web page.

According to some embodiments, whenever playback engine 210 is not able to find a web element that has sufficient web element similarity to the web element specified in the recorded performance skeleton, playback engine 210 may request user intervention using a visually displayed front-end that is rendered using a VNC client (not shown) on device 104.

Responsive to performance of the action in action column 1308 by browser 150 or by headless browser 219, browser 150 or headless browser 219 may send an update message to playback engine 210. The update message may include a complete or truncated representation of the object model of the web page after the action in action column 1308 has been performed. Playback engine 210 may then determine, based on the update message and a possible next action according to order represented by an index in step column 1302 in first example playback performance skeleton 1300, a next action message to send to browser 150 or to headless browser 219. Similar to the first action message as previously described, the next action message may include the type of action to perform (e.g., clicking, typing, etc.), an xPath from the object model location column 1306 referencing the web element on which to perform the next action and any additional operational parameters from value column 1304 (i.e., if the next action is a typing action, the operational parameters may include the specific text to type in the web element referenced by the xPath in object model location column 1306). Browser 150 or headless browser 219 may, responsive to receipt of a next action message, perform the next action on the web page, simulating a user's use of keyboard and mouse for typing and clicking actions, respectively.

FIG. 14 illustrates a second playback performance skeleton 1400 to be used for ordering a ride from Uber™. Second example playback performance skeleton 1400 of FIG. 14 includes the same columns as first example playback performance skeleton 1300 of FIG. 13, however, the keys in a keys column 1403, the values in a values column 1404, the xPaths in an object model location column 1406, and the actions in an action column 1408 are different. Second example playback performance skeleton 1400 of FIG. 14 may be derived from a recorded performance skeleton 902 and may be referenced within example task sequence performance skeleton 1200 of FIG. 12.

Performance controller 223 may be configured to generate an action message based on task sequence performance skeleton 1200, which, as has been discussed, references individual playback performance skeletons 906 and object models of the web page upon which the task is to be performed. For each action in action column 1308 performed in the order as dictated by an index in step column 1302, performance controller 223 may generate an action message to send to browser 150 or to headless browser 219.

An action message can include the type of action to perform (e.g., clicking, typing, etc.), the xPath from the object model location column 1306 for the web element on which to perform the action, and any additional operational parameters from value column 1304 (i.e., if the action is a typing action, the specific text to type in the web element referenced by xPath in object model location column 1306). Headless browser 219 may, responsive to receipt of an action message, perform an action on the web page, simulating a user's use of keyboard and mouse for typing and clicking actions, respectively. According to some embodiments, the typing and clicking actions may be performed by the browser in a window not shown on a screen.

Performance controller 223 may further be able to receive additional information to determine the satisfaction of conditionalities within the task sequence performance skeleton.

As illustrated in FIG. 9, intent matcher 256 processes information 42 to determine task sequence performance skeleton 904. For example task sequence performance skeleton 1200, it may be understood that intent matcher 256 has determined the order represented by entries in index column 1202 for each task referenced in task column 1206. For natural language input 702 in the example of FIG. 7, the first task is related, in part, to finding a duration of travel for walking from the present location to a nearby McDonalds™ location. It may be further understood that intent matcher 256 has determined that the second task in task column 1206 is related to ordering a ride from Uber™, from the present location to the nearby McDonalds™ location. Intent matcher 256 may include, in the task sequence performance skeleton 1200, any return variables in return column 1208 from task performance (i.e., both durations). The return variables may be stored.

In operation, based on information 42, performance controller 223 may evaluate a conditionality from conditionality column 1204. In the depicted example of FIG. 7, this would constitute evaluating whether a returned duration is longer than ten minutes. If the conditionality from conditionality column 1204 is satisfied, performance controller 223 may conclude that the second task (i.e., ordering a ride from Uber™) should be performed. Performance controller 223 may determine that Uber™ should be provided with the user's present location, as a ride origin, and provided with a location, returned from execution of the first task, for the nearby McDonalds™ location, as a ride destination.

As an alternative to model 900 of FIG. 9, an end-to-end neural network architecture may be employed for task performance. This neural network may be a supervised or unsupervised neural network. The neural network may receive, as an input, natural language input 702 and generate (i.e., without explicitly deriving key value pairs, etc.), as an output, the task sequence performance skeleton 1200. Optionally, the neural network may directly interface with headless browser 219 for the entire task performance.

Figure 15:
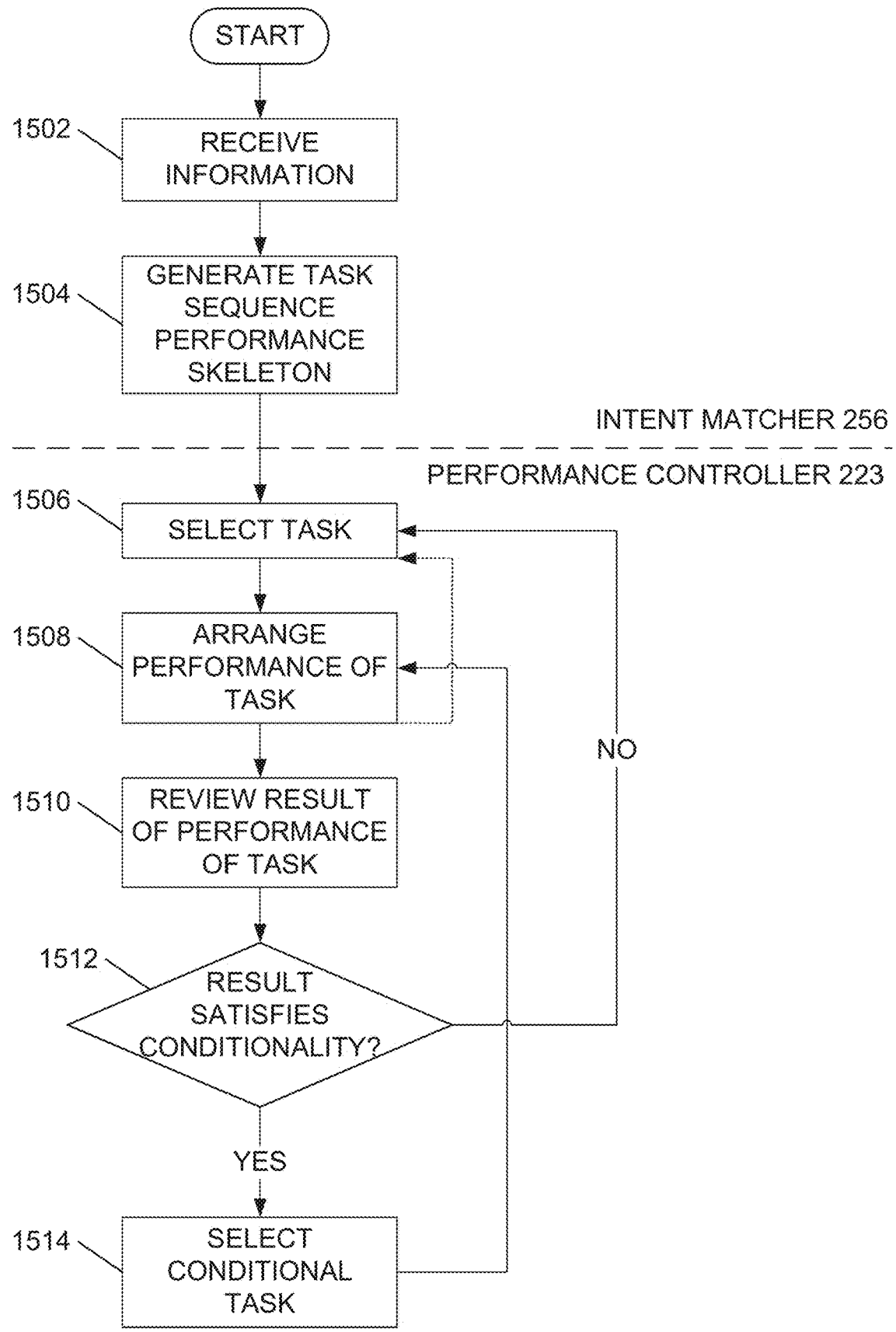
FIG. 15 illustrates example steps in a method of executing a sequence of tasks, in accordance with aspects of the present application.

FIG. 15 illustrates example steps in a method of use of intent matcher 256 and performance controller 223. As discussed in relation to FIG. 9, upon receiving (step 1502) information 42, intent matcher 256 generates (step 1504) task sequence performance skeleton 904. Task sequence performance skeleton 904 may include a reference to a first playback performance skeleton for a first task and a successive playback performance skeleton for a successive task. The successive task may be associated with a conditionality referencing a result returned from performance of the first task. Performance controller 223 may select (step 1506), from the task sequence performance skeleton 904, a first task. Performance controller 223 may then arrange (step 1508) performance of the first task.

According to embodiments where a VNC connection is used, the same VNC connection may be used for all tasks within task sequence performance skeleton 904. Alternatively, multiple VNC connections may be used in parallel.

Figure 16:
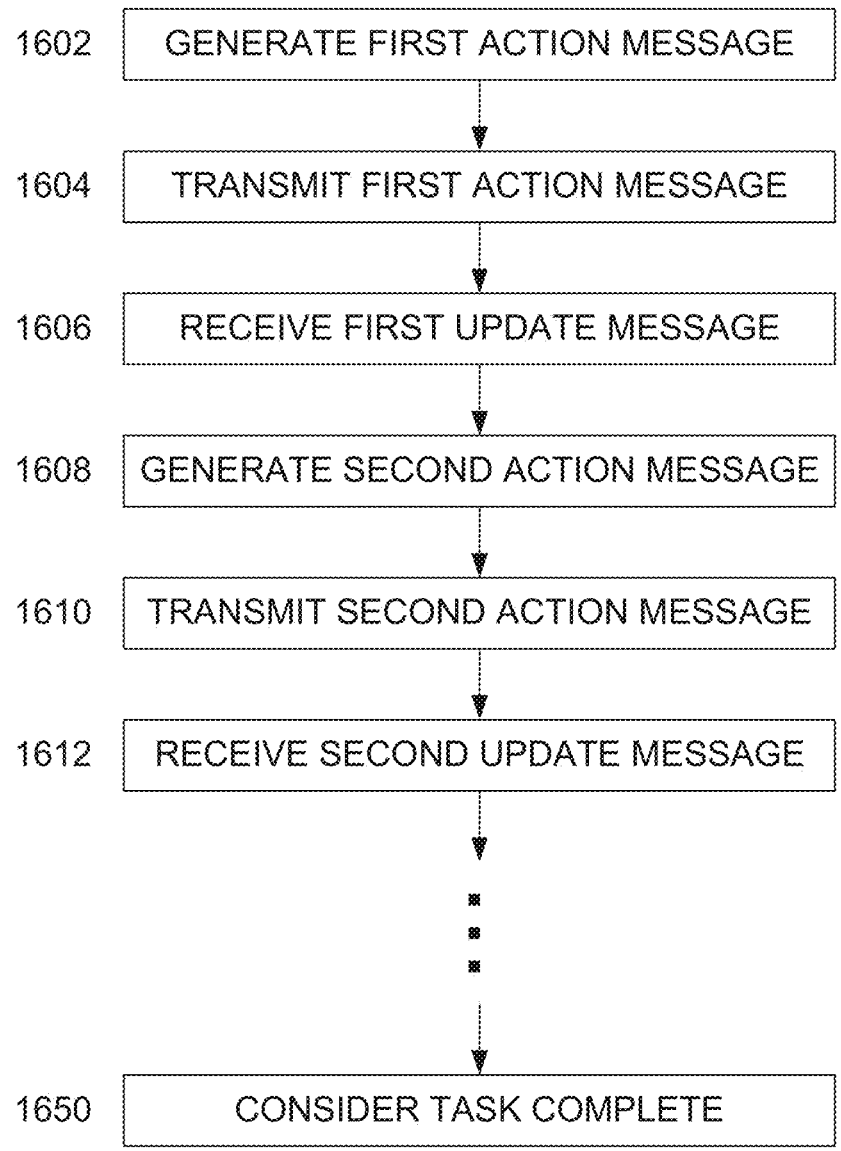
FIG. 16 illustrates example steps in a method of arranging performance of a task on a web page, in accordance with aspects of the present application.

FIG. 16 illustrates example steps in a method of arranging (step 1508) performance of a task, according to one embodiment. Performance controller 223 generates (step 1602) a first action message based on a playback performance skeleton. The first action message includes instructions causing headless browser 219 to perform a first action on the web page. The first action may be a mouse click, a mouse scroll, a mouse cursor hover, a drag-and-drop, or a keyboard input, simulating what would have been an input event from user 102 interacting with user interface 158 of user device 104. Upon generating the first action message, performance controller 223 transmits (step 1604) the first action message to, for example, headless browser 219. According to some embodiments, the first action message may be transmitted (step 1604) from a server hosting performance controller 223.

Figure 17:
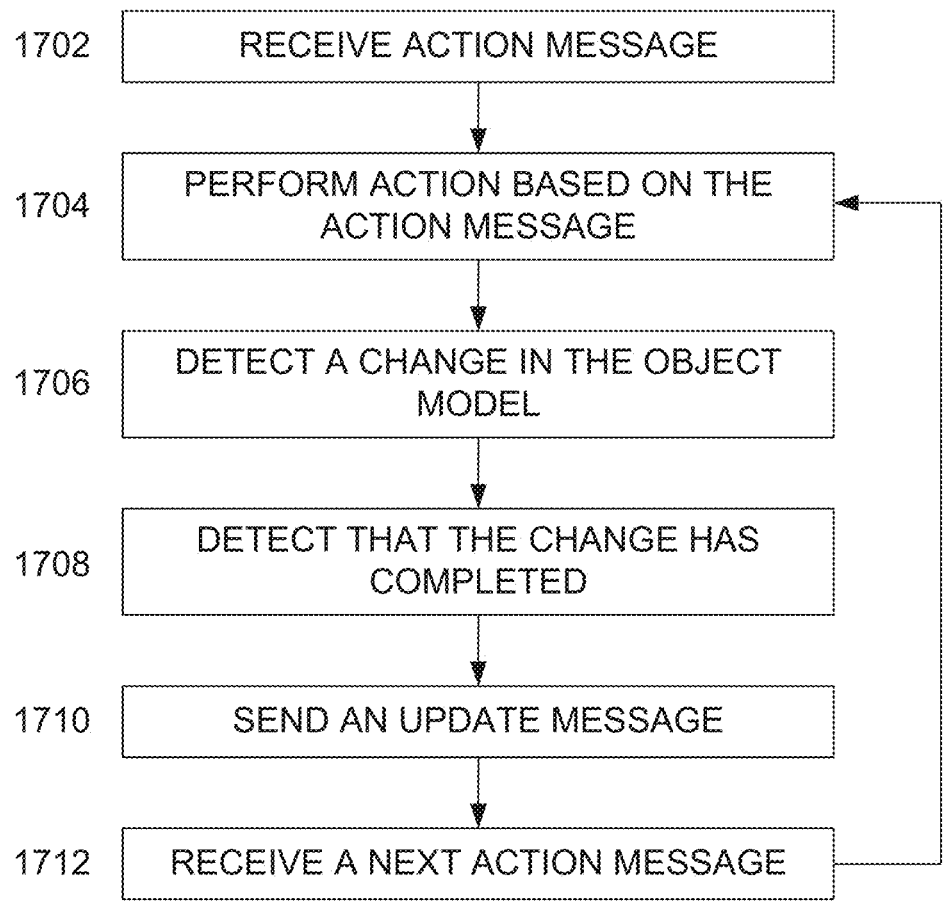
FIG. 17 illustrates example steps in a method of performing an action on a web page, in accordance with aspects of the present application.

FIG. 17 illustrates example steps in a method of performing an action on a web page, according to one embodiment. Subsequent to transmission (step 1604) of the first action message, headless browser 219 receives (step 1702) the first action message. The first action message includes instructions causing headless browser 219 to perform the first action on the web page.

Responsive to receiving (step 1702) the action message, headless browser 219 performs (step 1704) the action on the web page. The performance (step 1704) of the action may cause a change in the object model. As discussed hereinbefore, the object model may be a hierarchical tree structure rendering of a web page like the known DOM. Subsequent to the performing (step 1704) the action, headless browser 219 detects (step 1706) a change in the object model. The change may be detected by mutation observers 530 that are designated to observe changes that have taken place in the object model and to record in which web elements of the object model the changes have taken place.

According to some embodiments, the change detected in the object model may be caused indirectly by the action performed. For example, if the action was "send an original email message," one of the mutation observers may detect that the compose email button was clicked and, subsequently, a new window was opened up in headless browser 219.

Headless browser 219 next detects (step 1708) that the change in the object model has been completed. According to some embodiments, the change in the object model may be detected (step 1708) as having been completed after multiple changes in the object model have occurred. For example, if, in response to the action, multiple new elements have been generated in the web page and, consequently, multiple new web elements have been generated in the object model of the web page, the change may not be considered to have completed occurring until each of the changes in the object model are complete.

Responsive to detecting (step 1708) that the change in the object model has been completed, headless browser 219 transmits (step 1710), to performance controller 223, a first update message containing an indication of the change in the object model caused by the performing of the first action.

Returning to FIG. 16, performance controller 223 may then receive (step 1606), from the headless browser 219, the first update message containing the indication the change in the object model for the web page. Performance controller 223 may, upon receiving (step 1606) the update message, generate (step 1608) a second action message. The update message may indicate that the first action has been performed and recorded within the object model. For example, if the action was a text entry action, the update message may indicate that the intended text now appears in a specific object model xPath. The generating (step 1608) the second action message may be based on a change in the object model, identified in the first update message and based on the playback performance skeleton. According to some embodiments, the update message may indicate that a specific web element has appeared in the object model (such as, for example, indicative of an email message having been received). The generation of the second action message, according to some embodiments, may be conditional on specific content that may be found in the update message.

Performance controller 223, upon generating (step 1608) the second action message, may transmit (step 1610) the second action message. The second action message may, for example, contain instructions for headless browser 219 to perform a second action on the web page.

Returning to FIG. 17, in a manner consistent with the receiving (step 1702) the action message, headless browser 219 receives (step 1712) the second action message. Headless browser 219 performs (step 1704) the second action, detects (step 1706) a change in the object model, detects (step 1708) that the change has completed and transmits (step 1710) a second update message.

Subsequent to headless browser 219 performing the second action, performance controller 223 may receive (step 1612), from headless browser 219, the second update message indicating the change in the object model for the web page.

Performance controller 223 may repeat generating and transmitting action messages and receiving update messages as long as there are more actions in the task represented by the playback performance skeleton. The steps of performing the action (step 1704) through to, and including, receiving a next action message (step 1712) may be iterated and repeated as headless browser 219 performs each action responsive to receipt (step 1712), from performance controller 223, of each action message. When there are no further actions in the task represented by the playback performance skeleton, performance controller 223 may consider (step 1650) the task represented by the playback performance skeleton to be complete.

Returning to FIG. 15, upon considering (step 1650) the task to be complete, performance controller 223 may, review (step 1510) the result of the performance of the first task. The reviewing (step 1510) may involve compiling all update messages received (steps 1606, 1612) during the arranging (step 1508) of the performance of the first task into a single result.

Performance controller 223 may then determine (step 1512) whether the result satisfies the conditionality. Responsive to determining (step 1512) that the result satisfies the conditionality, performance controller 223 may select (step 1514) the successive task (a "conditional task") that is associated, in task sequence performance skeleton 904, with satisfaction of the conditionality. Performance controller 223 may then arrange (step 1508), based on the playback performance skeleton associated with the conditional task, performance of the conditional task. Responsive to determining (step 1512) that the result does not satisfy the conditionality, performance controller 223 may select (step 1514) a successive task. Performance controller 223 may then arrange (step 1508), based on the playback performance skeleton associated with the successive task, performance of the successive task. If an error (such as network connectivity issues) occurs mid-task performance, performance controller may halt task performance and communicate an error message to user 102.

It should be clear that determining (step 1512) whether a result satisfies a conditionality may not be necessary at the completion of the arrangement (step 1508) of the performance of a given task. Consequently, reviewing (step 1510) the result of the performance of the given task may, also, not be necessary. That is, upon the completion of the arrangement (step 1508) of the performance of a given task, performance controller 223 may simply proceed to select (step 1514) a successive task.

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions, and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor-readable storage medium or media for storage of information, such as computer/processor-readable instructions, data structures, program modules, and/or other data. A non-exhaustive list of examples of non-transitory computer/processor-readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, memory, such as random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor-readable storage media.

The invention claimed is:

1. A computer-implemented method of arranging execution of natural language instructions, the method comprising:
   receiving a natural language input indicative of the natural language instructions;
   deriving, from the natural language input using a text analysis algorithm, information, the information including a plurality of action data, the plurality of action data including a key and a value corresponding to the key, the deriving including obtaining, from a database and based on the natural language input, the value;
   interpreting the natural language input as a sequence of tasks including:
      a first task defined using first action data among the plurality of action data; and
      a conditional successive task:
         defined using second action data among the plurality of action data; and
         associated with a conditionality referencing a result returned from performance of the first task;
   arranging performance of the first task at a headless browser;
   determining that the result returned from the performance of the first task satisfies the conditionality, wherein the result includes, at least in part, an update message received from the headless browser, the update message indicating that an action has been performed and recorded within an object model; and
   responsive to the determining, arranging performance of the conditional successive task at the headless browser.

2. The method of claim 1, wherein the interpreting the natural language input comprises resolving ambiguous information in the natural language input.

3. The method of claim 2, wherein the resolving comprises searching within a knowledge base to clarify the ambiguous information.

4. The method of claim 3, wherein the knowledge base is stored on an external web hosting server.

5. The method of claim 3, wherein the knowledge base is stored on a server hosting a playback engine.

6. The method of claim 5, further comprising, based on the result returned from the performance of the first task, updating the knowledge base.

7. The method of claim 2, wherein the resolving comprises using information retrieved from a search engine.

8. The method of claim 2, wherein the resolving comprises generating a prompt on a user interface of an electronic device for providing additional information.

9. The method of claim 8, wherein the prompt is a text entry field.

10. The method of claim 8, wherein the prompt is a button.

11. The method of claim 8, wherein the resolving further comprises receiving, via the user interface, additional information in response to the prompt.

12. A computer-implemented method of arranging execution of natural language instructions, the method comprising:
   receiving a natural language input indicative of the natural language instructions;
   deriving, from the natural language input, information, the information including:
      a plurality of action data, the plurality of action data including a key and a value corresponding to the key, the deriving including using a text analysis algorithm to obtain, from a database and based on the natural language input, the value; and a plurality of task data, the plurality of task data including task logic;

interpreting the plurality of task data as relating to a sequence of tasks including:

a first task defined according to first action data among the plurality of action data; and a conditional successive task, wherein the conditional successive task is:

defined according to second action data among the plurality of action data; and associated with the task logic, the task logic including a conditionality that references a future result to be returned from performance of the first task;

arranging performance of the first task at a headless browser, the arranging based on the first action data;

receiving, from the headless browser, an update message, the update message including a indication that an action has been performed and recorded within an object model, the update message forming at least part of an actual result returned from performance of the first task;

determining that the actual result returned from the performance of the first task satisfies the conditionality; and responsive to the determining, arranging performance of the conditional successive task at the headless browser.

* * * * *